United States Patent
Chen et al.

(10) Patent No.: US 9,336,958 B2
(45) Date of Patent: May 10, 2016

(54) NANOPOROUS CERAMIC COMPOSITE METAL

(75) Inventors: Mingwei Chen, Miyagi (JP); Xingyou Lang, Miyagi (JP); Takeshi Fujita, Miyagi (JP)

(73) Assignee: TOHUKU UNIVERSITY (JP)

( * ) Notice: Subject to any disclaimer, the term of this patent is extended or adjusted under 35 U.S.C. 154(b) by 218 days.

(21) Appl. No.: 13/995,896

(22) PCT Filed: Dec. 21, 2011

(86) PCT No.: PCT/JP2011/079664
§ 371 (c)(1),
(2), (4) Date: Jun. 19, 2013

(87) PCT Pub. No.: WO2012/086697
PCT Pub. Date: Jun. 28, 2012

(65) Prior Publication Data
US 2013/0295461 A1 Nov. 7, 2013

(30) Foreign Application Priority Data

Dec. 21, 2010 (JP) ................................. 2010-284163

(51) Int. Cl.
*H01M 4/40* (2006.01)
*H01M 4/50* (2010.01)
(Continued)

(52) U.S. Cl.
CPC ................ *H01G 11/30* (2013.01); *B82Y 30/00* (2013.01); *H01G 11/46* (2013.01); *H01G 11/86* (2013.01);
(Continued)

(58) Field of Classification Search
CPC ....... H01M 4/131; H01M 4/366; H01M 4/48; H01M 4/50; H01M 4/52; H01M 4/56
See application file for complete search history.

(56) References Cited

FOREIGN PATENT DOCUMENTS

| JP | 2007213876 | 8/2007 | .............. H01M 8/02 |
| JP | 2008184671 | 8/2008 | ................ B82B 1/00 |

OTHER PUBLICATIONS

Zhang, H.P; Yang, L.C.; Fu, L.J.; Cao, Q.; Sun, D.L.; Wu, Y.P.; and Holze, R., Core-shell structured electrode materials for lithium ion batteries, J Solid State Electrochem (2009) 13:1521-1527.*

(Continued)

*Primary Examiner* — Ula C Ruddock
*Assistant Examiner* — Thomas Parsons
(74) *Attorney, Agent, or Firm* — Hayes Soloway P.C.

(57) ABSTRACT

Since pseudo-capacitance transition metal oxides (for example, $MnO_2$) have high theoretical capacitance and are eco-friendly, inexpensive, and abundant in the natural world, pseudo-capacitance transition metal oxides are gaining attention as promising capacitor electrode materials. However, pseudo-capacitance transition metal oxides have relatively low electronic conductivity and limited charging and discharging rates, and it is therefore difficult to use pseudo capacitance transition metal oxides for high output power applications. If a plating process accompanying a liquid-phase precipitation reaction is performed on a nanoporous metal such as nanoporous gold (NPG) to deposit a ceramic material (for example, $MnO_2$ or $SnO_2$) on the surface of a core metal (for example, NPG), a nanoporous metal-ceramic composite having particular structural characteristics and comprising a metal core part and a ceramic deposition part can be obtained. This hybrid material is a good functional material and exhibits excellent functions when used as an electrode material for high-performance super capacitor (SC) devices or as an electrode material for LIB.

7 Claims, 15 Drawing Sheets

(51) Int. Cl.

| | | |
|---|---|---|
| H01G 11/30 | (2013.01) | |
| H01M 4/131 | (2010.01) | |
| H01M 4/134 | (2010.01) | |
| H01M 4/136 | (2010.01) | |
| H01M 4/80 | (2006.01) | |
| H01M 4/13 | (2010.01) | |
| H01M 4/36 | (2006.01) | |
| H01M 4/38 | (2006.01) | |
| H01M 4/48 | (2010.01) | |
| B82Y 30/00 | (2011.01) | |
| H01G 11/46 | (2013.01) | |
| H01G 11/86 | (2013.01) | |
| H01M 10/0525 | (2010.01) | |

(52) U.S. Cl.
CPC .............. *H01M 4/13* (2013.01); *H01M 4/131* (2013.01); *H01M 4/134* (2013.01); *H01M 4/136* (2013.01); *H01M 4/366* (2013.01); *H01M 4/38* (2013.01); *H01M 4/48* (2013.01); *H01M 4/80* (2013.01); *H01M 10/0525* (2013.01); *Y02E 60/122* (2013.01); *Y02E 60/13* (2013.01); *Y02P 70/54* (2015.11); *Y02T 10/7011* (2013.01); *Y02T 10/7022* (2013.01); *Y10T 428/249957* (2015.04)

(56) References Cited

OTHER PUBLICATIONS

An et al., "Supercapacitors using single-walled carbon nanotube electrodes", Adv. Mater. 7, 497-500 (2001) (4 pgs).

Arico et al., "Nanostructured materials for advanced energy conversion and storage devices" Nat. Mater. 4, 366-377 (2005) (12 pgs).

Besenhard et al., "Will advanced lithium-alloy anodes have a chance in lithium-ion batteries?", J. Power Sources 1997, 68, 87 (4 pgs).

Brousse et al., "A hybrid activated carbon-manganese dioxide capacitor using a mild aqueous electrolyte", J. Electrochem. Soc. 151, A614-A622 (2004) (9 pgs).

Burke, A., "Ultracapacitors: Why, how, and where is the technology?", J. Power Sources 91, 37-50 (2000) (14 pgs).

Chang et al., "Material characterization and electrochemical performance of hydrous manganese oxide electrodes for use in electrochemical pseudocapacitors", J. Electrochem. Soc. 150, A1333-A1338 (2003) (6 pgs).

Chen et al., "Synthesis and pseudocapactive studies of composite films of polyaniline and manganese oxide nanoparticles", J. Power Sources 195, 3742-3747 (2010) (6 pgs).

Chmiola et al., "Anomalous increase in carbon capacitance at pore sizes less than 1 nanometer", Science 313, 1760-1763 (2006) (5 pgs).

Conway et al., "The role and utilization of pseudocapacitance for energy storage by supercapacitors", J. Power Sources 66, 1-14 (1997) (14 pgs).

Cottineau et al., "Nanostructured transition metal oxides for aqueous hybrid electrochemical supercapacitors", Appl. Phys. A 82, 599-606 (2006) (8 pgs).

Courtney et al., "Electrochemical and In Situ X-Ray Diffraction Studies of the Reaction of Lithium with Tin Oxide Composites", J. Electrochem. Soc. 1997, 144, 2045 (8 pgs).

Crosnier et al., "New anode systems for lithium ion cells", J. Power Sources 2001, 94, 169-174 (6 pgs).

Desilvestro et al., "Metal oxide cathode materials for electrochemical energy storage: A review", J. Electrochem. Soc. 137, C5-C22 (1990) (18 pgs).

Ding et al., "Nanoporous metals for catalytic and optical applications", MRS Bulletin 34, 569 (2009) (8 pgs).

Erlebacher et al.,"Evolution of nanoporosity in dealloying", Nature 410, 450-453 (2001) (4 pgs).

Fischer et al., "Electroless deposition of nanoscale $MnO_2$ on ultraporous carbon nanoarchitectures: correlation of evolving pore-solid structure and electrochemical performance", J. Electrochem. Soc. 155, A246-A252 (2008) (7 pgs).

Fujita et al., "Unusually small electrical resistance of three-dimensional nanoporous gold in external magnetic fields", Phys. Rev. Lett. 101, 166601 (2008) (4 pgs).

Goward et al., "On the Nature of Li Insertion in Tin Composite Oxide Glasses", Electrochem. Solid-State Lett. 1999, 2, 367-370, abstract only (1 pg).

Grugeon et al., "Particle Size Effects on the Electrochemical Performance of Copper Oxides toward Lithium", J. Electrochem. Soc. 2001, 148, A285 (8 pgs).

Han et al., "Simple Synthesis of Hollow Tin Dioxide Microspheres and Their Application to Lithium-Ion Battery Anodes", Adv. Funct. Mater., 2005, 15, 1845 (6 pgs).

Hassoun et al., "High-Rate, Long-Life Ni—Sn Nanostructured Electrodes for Lithium-Ion Batteries", Adv. Mater. 2007, 19, 1632 (4 pgs).

Hou et al., "Design and synthesis of hierarchical $MnO_2$ nanospheres/carbon nanotubes/conducting polymer ternary composite for high performance electrochemical electrodes", Nano Lett. 10, 2727-2733 (2010) (7 pgs).

Hu et al., "Highly conductive paper for energy-storage devices", Proc. Natl. Acad. Sci. USA 106, 21490-21494 (2009) (5 pgs).

Hu et al., "Stretchable, porous, and conductive energy textiles", Nano Lett. 10, 708-714 (2010) (7 pgs).

Huang et al., "Theoretical model for nanoporous carbon supercapacitors", Angew. Chem. Int. Ed. 47, 520-524 (2008) (5 pgs).

Idota et al., "Tin-Based Amorphous Oxide: A High-Capacity Lithium-Ion-Storage Material", Science 1997, 276, 1395 (4 pgs).

International Preliminary Report on Patentability issued in corresponding application No. PCT/JP2011/079664, dated Jun. 27, 2013 (5 pgs).

International Search Report issued in corresponding application No. PCT/JP2011/079664, dated Mar. 19, 2012 (4 pgs).

Jia et al., "Enhanced Photoelectrocatalytic Activity of Methanol Oxidation on $T１O_2$-Decorated Nanoporous Gold", J Phys Chem C, 2009. 09.10, vol. 113, No. 36, pp. 16138-16143 (6 pgs).

Kaempgen et al., "Printable thin film supercapacitors using single-walled carbon nanotubes", Nano Lett. 9, 1872-1876 (2009) (5 pgs).

Kotz et al., "Principles and applications of electrochemical capacitors", Electrochim. Acta 45, 2483-2498 (2000) (16 pgs).

Lee et al., "Layer-by-layer assembly of all carbon nanotube ultrathin films for electrochemical applications", J. Am. Chem. Soc. 131, 671-679 (2009) (9 pgs).

Lee et al., "Lithium Intercalation and Deintercalation Reactions in Synthetic Graphite Containing a High Dispersion of SnO", Electrochem. Solid-State Lett. 2000, 3, 167, abstract only (1 pg).

Lee et al.,"Synthesis of Tin-Encapsulated Spherical Hollow Carbon for Anode Material in Lithium Secondary Batteries", J. Am. Chem. Soc. 2003, 125, 5652-5653 (2 pgs).

Li et al., "A High-Rate, High-Capacity, Nanostructured Sn-Based Anode Prepared Using Sol-Gel Template Synthesis", J. Electrochem. Soc. 2001, 148, A164 (7 pgs).

Liu et al., "$MnO_2$/poly(3,4-ethylenedioxythiophene) coaxial nanowires by one-step coelectrodeposition for electrochemical energy storage", J. Am. Chem. Soc. 130, 2942-2943 (2008) (2 pgs).

Miller et al., "Electrochemical capacitors for energy management", Science 321, 651-652 (2008) (3 pgs).

Nam et al., "Virus-Enabled Synthesis and Assembly of Nanowires for Lithium Ion Battery Electrodes", Science 2006, 312, 885 (6 pgs).

Nazri et al., "Lithium Batteries Science and Technology", Kluwer: Boston, 2004, relevant pages (9 pgs).

Pang et al., "Novel electrode materials for thin-film ultracapacitors: Comparison of electrochemical properties of sol-gel-derived and electrodeposited manganese dioxide", J. Electrochem. Soc. 147, 444-450 (2000) (7 pgs).

Pech et al., "Ultrahigh-power micrometer-sized supercapacitors based on onion-like carbon", Nature Nanotech, 5, DOI: 10.1038/NNAN0.2010.162 (2010) (4 pgs).

Pushparaj et al., "Flexible energy storage devices based on nanocomposite paper", Proc. Natl. Acad. Sci. USA 104, 13574-13577 (2007) (4 pgs).

(56) References Cited

OTHER PUBLICATIONS

Qiao et al., "SnO$_2$@C core-shell spheres: synthesis, characterization, and performance in reversible Li-ion storage", J. Mater. Sci. 2008, 43,2778 (7 pgs).

Reddy et al., "Multisegmented Au-MnO$_2$/carbon nanotube hybrid coaxial arrays for high-power supercapacitor applications", J. Phys. Chem. C 114, 658-663 (2010) (6 pgs).

Rudge et al., "Conducting polymers as active materials in electrochemical capacitors", J. Power Source, 47, 89-107 (1994) (19 pgs).

Shembel et al., "Electrolytic molybdenum oxides in lithium batteries", J. Solid St. Electrochem. 2005, 9, 96 (10 pgs).

Simon et al., "Materials for electrochemical capacitors" Nat. Mater. 7, 845-854 (2008) (10 pgs).

Tarascon et al., "Issues and challenges facing rechargeable lithium batteries", Nature 2001, 414, 359 (9 pgs).

Toupin et al., "Charge storage mechanism of MnO$_2$ electrode used in aqueous electrochemical capacitor", Chem. Mater. 16, 3184-3190 (2004) (7 pgs).

Wachtler et al., "The effect of the binder morphology on the cycling stability of Li-alloy composite electrodes", J. Electroanal. Chem. 2001, 12, 510 (8 pgs).

Winter et al., "Electrochemical lithiation of tin and tin-based inter metallics and composites", Electrochim. Acta 1999, 45, 31 (20 pgs).

Winter et al., "Insertion Electrode Materials for Rechargeable Lithium Batteries", P. Adv. Mater. 1998, 10, 725-763 (39 pgs).

Winter et al., "What are batteries, fuel cells, and supercapacitors?" Chem. Rev. 104, 4245-4269 (2004) (26 pgs).

Wu et al., "Redox deposition of manganese oxide on graphite for supercapacitors", Electrochem. Commun. 6, 499-504 (2004) (6 pgs).

Xiao et al., "Electrochemical Performance of Amorphous and Crystalline Sn$_2$P$_2$O$_7$ Anodes in Secondary Lithium Batteries", J. Electrochem. Soc. 1999, 146, 3623 (7 pgs).

Xu et al., "Asymmetric activated carbon-manganese dioxide capacitors in mild aqueous electrolytes containing alkaline-earth cations", J. Electrochem. Soc. 156, A435-441 (2009) (7 pgs).

Yan et al., "Carbon nanotube/MnO$_2$ composites synthesized by microwave-assisted method for supercapacitors with high power and energy densities", J. Power Sources 194, 1202-1207 (2009) (6 pgs).

Yang et al., "Self-Construction of Hollow SnO$_2$ Octahedra Based on Two-Dimensional Aggregation of Nanocrystallites", Angew. Chem., Int. Ed., 2004, 43, 5930 (4 pgs).

Yang et al., "Sub-Microcrystalline Sn and Sn—SnSb Powders as Lithium Storage Materials for Lithium-Ion Batteries", Electrochem. Solid-State Lett. 1999, 2, 161 (3 pgs).

Yu et al., "Encapsulation of Sn@carbon Nanoparticles in Bamboo-like Hollow Carbon Nanofibers as an Anode Material in Lithium-Based Batteries", Angew. Chem. Int. Ed., 2009, 48, 6485 (5 pgs).

Yu et al., "Tin Nanoparticles Encapsulated in Porous Multichannel Carbon Microtubes: Preparation by Single-Nozzle Electrospinning and Application as Anode Material for High-Performance Li-Based Batteries", J. Am. Chem. Soc., 2009, 131 15984 (2 pgs).

Zhou et al., "Hydrous manganese oxide/carbon nanotube composite electrodes for electrochemical capacitors", J. Solid State Electrochem. 8, 482-487 (2004) (6 pgs).

Zhu et al., "Synthesis of MnO$_2$ nanoparticles confined in ordered mesoporous carbon using a sonochemical method", Adv. Funct. Mater. 15, 381-386 (2005) (6 pgs).

* cited by examiner

NANOPOROUS CERAMIC COMPOSITE METAL

TECHNICAL FIELD

The present invention relates to a nanoporous metal modified with ceramic plating, and to a method for manufacturing the same. The present invention relates to the deposition modification of a nanoporous metal with ceramics. In particular, the present invention relates to a nanoporous metal/ceramic hybrid structure constituted by an at least binary system of a ceramic and a metal, such as a nanoporous metal/ceramic composite substance (including, for example, a thin film or foil) constituted at least by a porous metal skeleton and a ceramic deposit, and to a method for manufacturing the same; the composite typically having (1) a deposited ceramic layer (shell, coating, or packed layer) and a metal framework (interior or skeleton); the metal framework (nanoporous metal part) having an average pore size of roughly 80 nm or less, roughly 60 nm or less, in some cases roughly 50 nm or less, especially roughly 40 nm or less, or roughly 30 nm or less, or, for example, roughly 25 nm or less; and a super capacitor device constituted by an electrode using the nanoporous metal/ceramic composite material substance (for example, a thin film) having superior electrical properties and being desirable for various applications, such as power supply devices, power storage devices, rapid charging devices, and the like. A lithium battery using this electrode, such as a lithium ion secondary cell, has superior durability and charge/discharge cycle properties, and is desirable for various applications, such as batteries, power accumulation devices, portable electronic devices, automobile batteries, and the like.

BACKGROUND ART

Nanoporous metals have properties differing greatly from those of bulk metals, and show promise for a variety of noteworthy functions within the physical and chemical fields. For example, nanoporous metals exhibit large surface area and specific size effects, show promise of having superior electrical properties, physical and chemical properties, physical characteristics, and optical and electromagnetic effects, and are expected to be applied for use as catalysts and nanodevice nanostructures.

Supercapacitors ("SCs"), which combine the unique features of high power, high energy, and long life, have been the subject of attention as a halfway point between batteries and normal capacitors (see non-patent document 1: Winter, M.; Brodd, R. J., "What are batteries, fuel cells, and supercapacitors?" Chem. Rev. 104, 4245-4269 (2004); non-patent document 2: Simon, P.; Gogotsi, Y., "Materials for electrochemical capacitors" Nat. Mater. 7, 845-854 (2008); non-patent document 3: Arico, A. S.; Bruce, P.; Scrosati, B.; Tarascon, J. M.; Van Schalkwijk, W., "Nanostructured materials for advanced energy conversion and storage devices" Nat. Mater. 4, 366-377 (2005); non-patent document 4: Kotz, R.; Carlen, M., "Principles and applications of electrochemical capacitors", Electrochim. Acta 45, 2483-2498 (2000); non-patent document 5: Burke, A., "Ultracapacitors: Why, how, and where is the technology?", J. Power Sources 91, 37-50 (2000); non-patent document 6: Miller, J. R.; Simon P., "Electrochemical capacitors for energy management", Science 321, 651-652 (2008); non-patent document 7: Pech, D.; Brunet, M.; Durou, H.; Huang, P. H.; Mochalin, V.; Gogotsi, Y.; Taberna, P. L.; Simon, P., "Ultrahigh-power micrometer-sized supercapacitors based on onion-like carbon", Nature Nanotech, 5, DOI: 10.1038/NNANO.2010.162 (2010)).

SCs have large specific capacitances as the result of two charge mechanisms, namely, double-layer capacitance (non-patent documents 2-5; non-patent document 8: Huang, J. S.; Sumpter, B. G.; Meunier, V., "Theoretical model for nanoporous carbon supercapacitors", Angew. Chem. Int. Ed. 47, 520-524 (2008)) and pseudocapacitance performing a charge-transfer reaction (non-patent documents 2-5; non-patent document 9: Conway, B. E.; Birss, V.; Wojtowicz, J., "The role and utilization of pseudocapacitance for energy storage by supercapacitors", J. Power Sources 66, 1-14 (1997); non-patent document 10: Rudge, A.; Davey, J.; Raistrick, I.; Gottesfeld, S.; Ferraris, J. P., "Conducting polymers as active materials in electrochemical capacitors", J. Power Source, 47, 89-107 (1994)), these two phenomena occurring via a non-Faradaic process and a Faradaic process, respectively, at or near the electrode/electrolyte interface (non-patent documents 2-10). These two mechanisms are dependent on the active electrode material substance used in the SC, and may act separately or together (non-patent documents 2-5 and 9-10; non-patent document 11: Toupin, M.; Brousse, T.; Belanger, D., "Charge storage mechanism of $MnO_2$ electrode used in aqueous electrochemical capacitor", Chem. Mater. 16, 3184-3190 (2004); non-patent document 12: Pang, S. C.; Anderson, M. A.; Chapman, T. W., "Novel electrode materials for thin-film ultracapacitors: Comparison of electrochemical properties of sol-gel-derived and electrodeposited manganese dioxide", J. Electrochem. Soc. 147, 444-450 (2000); non-patent document 13: Chmiola, J.; Yushin, G.; Gogotsi, Y.; Portet, C.; Simon, P.; Taberna, P. L., "Anomalous increase in carbon capacitance at pore sizes less than 1 nanometer", Science 313, 1760-1763 (2006); non-patent document 14: Kaempgen, M.; Chan, C. K.; Ma, J.; Cui, Y.; Gruner, G., "Printable thin film supercapacitors using single-walled carbon nanotubes", Nano Lett. 9, 1872-1876 (2009); non-patent document 15: Pushparaj, V. L.; Shaijumon, M. M.; Kumar, A.; Murugesan, S.; Ci, L.; Vajtai, R.; Linhardt, R. J.; Nalamasu, O.; Ajayan, P. M., "Flexible energy storage devices based on nanocomposite paper", Proc. Natl. Acad. Sci. USA 104, 13574-13577 (2007)).

Of the numerous electrode material substances currently available, pseudocapacitative transition metal oxides, typically manganese dioxide ($MnO_2$), have been the object of intense scrutiny as one type of extremely promising electrode material substance due their high theoretical capacity, environmental friendliness, low costs, and natural abundance (non-patent document 11; non-patent document 16: Chang, J. K.; Tsai, W. T., "Material characterization and electrochemical performance of hydrous manganese oxide electrodes for use in electrochemical pseudocapacitors", J. Electrochem. Soc. 150, A1333-A1338 (2003)).

Lithium-ion batteries ("LIBs") are especially superior among energy storage media for their levels of power density per unit of volume or weight (non-patent document 25: J. M. Tarascon, M. Armand, Nature 2001, 414, 359; non-patent document 26: Y. Idota, T. Kubota, A. Matsufuji, Y. Maekawa, T. Miyasaka, Science 1997, 276, 1395; non-patent document 27: J. Hassoun, S. Panero, P. Simon, P. L. Taberna, B. Scrosati, Adv. Mater. 2007, 19, 1632; non-patent document 28: K. T. Nam, D. W. Kim, P. J. Yoo, C. Y. Chiang, N. Meethong, P. T. Hammond, Y. M. Chiang, A. M. Belcher, Science 2006, 312, 885). In order to achieve a greater reversible capacity (although such larger capacity might only be available momentarily), efforts have been made to discover a substance based on metallic tin as an anode electrode in lieu of a carbon-based compound (non-patent document 29: Lee, K. T.; Jung, Y. S.; Oh, S. M. J. Am. Chem. Soc. 2003, 125, 5652-5653; non-patent document 30: Winter, M.; Besenhard, J. O.; Spahr, M. E.; Novak, P. Adv. Mater. 1998, 10, 725-763; non-patent document 31: Coward, G. R.; Leroux, F.; Power, W. P.; Ouvrard, G.; Dmowski, W.; Egami, T.; Nazar, L. F. Electrochem. Solid-State Lett. 1999, 2, 367-370; non-patent document 32: Crosnier, O.; Brousse, T.; Devaux, X.; Fragnaud, P.; Schleich, D. M. J. Power Sources 2001, 94, 169-174) due to the high electron conductivity (non-patent document 33: Nazri, G.-A.; Pistoia G., "Lithium Batteries Science and Technology", Kluwer: Boston, 2004) and high theoretical capacity (990 mAh/g, equivalent to $Li_{4.4}Sn$) of metallic tin. These values are as much as three times those of graphite carbon (372 mAh/g, equivalent to $LiC_6$) (non-patent document 34: I. A. Courtney, J. R. Dahn, J. Electrochem. Soc. 1997, 144, 2045; non-patent document 35: M. Winter, J. O. Besenhard, Electrochim. Acta 1999, 45, 31).

However, the degradation in cycle properties that occurs when metallic tin is rendered into a shape suitable for use in LIBs is extremely problematic. This degradation arises primarily from pulverization, aggregation, and loss of electrical contact properties, leading to an effective change in volume (200% or greater) between charging and discharging (non-patent document 36: S. Grugeon, S. Laruelle, R. Herrera-Urbina, L. Dupont, P. Poizot, J. M. Tarascon, J. Electrochem. Soc. 2001, 148, A285; non-patent document 37: E. Shembel, R. Apostolova, V. Nagirny, I. Kirsanova, Ph. Grebenkin, P. Lytvyn, J. Solid St. Electrochem. 2005, 9, 96). The following three methods have primarily been offered as strategies for overcoming the problem of what is known as the pulverization of tin: reducing particle size; using a composite material substance; and selecting an optimized binder substance (non-patent document 26; non-patent document 38: N. Li, C. Martin, J. Electrochem. Soc. 2001, 148, A164; non-patent document 39: M. Wachtler, M. R. Wagner, M. Schmied, M. Winter, J. O. Besenhard, J. Electroanal. Chem. 2001, 12, 510; non-patent document 40: Y. Yu, L. Gu, C. Zhu, P. A. van Aken, J. Maier, J. Am. Chem. Soc., 2009, 131 15984; non-patent document 41: Y. Yu, L. Gu, C. Wang, A. Dhanabalan, P. A. van Aken, J. Maier, Angew. Chem. Int. Ed., 2009, 48, 6485). Two methods have been proposed to this end. The most common method for mitigating changes in volume or metal particle aggregation is to use an ultrapure metal-containing compound or active/inert composite alloy material substance (non-patent document 26; non-patent document 42: J. O. Besenhard, J. Yang, M. Winter, J. Power Sources 1997, 68, 87; non-patent document 43: J. Y. Lee, R. Zhang, Z. Liu, Electrochem. Solid-State Lett. 2000, 3, 167; non-patent document 44: J. Yang, M. Wachtler, M. Winter, J. O. Besenhard, Electrochem. Solid-State Lett. 1999, 2, 161). Another method is to construct a tin-based composite having a hollow structure, partially allowing for large changes in volume, and maintaining an electrical channel (non-patent document 29; non-patent document 45: H. G. Yang and H. C. Zeng, Angew. Chem., Int. Ed., 2004, 43, 5930; non-patent document 46: S. J. Han, B. C. Jang, T. Kim, S. M. Oh and T. Hyeon, Adv. Funct. Mater., 2005, 15, 1845). Electrodes having stable and high capacities of about 500 mAh/g have been reported very recently; these are manufactured by electrically depositing Sn—Ni on a nanoarchitectured copper substrate (non-patent document 47: J. Hassoun, S. Panero, P. Simon, P.-L. Taberna, B. Scrosati, Adv. Mater. 2007, 19, 1632).

PRIOR ART LITERATURE

Non-Patent Documents

Non-patent document 1: Winter, M.; Brodd, R. J. What are batteries, fuel cells, and supercapacitors Chem. Rev. 104, 4245-4269 (2004)

Non-patent document 2: Simon, P.; Gogotsi, Y. Materials for electrochemical capacitors. Nat. Mater. 7, 845-854 (2008)

Non-patent document 3: Arico, A. S.; Bruce, P.; Scrosati, B.; Tarascon, J. M.; Van Schalkwijk, W. Nanostructured materials for advanced energy conversion and storage devices. Nat. Mater. 4, 366-377 (2005)

Non-patent document 4: Kotz, R.; Carlen, M. Principles and applications of electrochemical capacitors. Electrochim. Acta 45, 2483-2498 (2000)

Non-patent document 5: Burke, A. Ultracapacitors: Why, how, and where is the technology. J. Power Sources 91, 37-50 (2000)

Non-patent document 6: Miller, J. R.; Simon P. Electrochemical capacitors for energy management. Science 321, 651-652 (2008)

Non-patent document 7: Pech, D.; Brunet, M.; Durou, H.; Huang, P. H.; Mochalin, V.; Gogotsi, Y.; Taberna, P. L.; Simon, P. Ultrahigh-power micrometer-sized supercapacitors based on onion-like carbon. Nature Nanotech. 5, DOI: 10.1038/NNANO.2010.162 (2010)

Non-patent document 8: Huang, J. S.; Sumpter, B. G.; Meunier, V. Theoretical model for nanoporous carbon supercapacitors. Angew. Chem. Int. Ed. 47, 520-524 (2008)

Non-patent document 9: Conway, B. E.; Birss, V.; Wojtowicz, J. The role and utilization of pseudocapacitance for energy storage by supercapacitors. J. Power Sources 66, 1-14 (1997)

Non-patent document 10: Rudge, A.; Davey, J.; Raistrick, I.; Gottesfeld, S.; Ferraris, J. P. Conducting polymers as active materials in electrochemical capacitors. J. Power Source, 47, 89-107 (1994)

Non-patent document 11: Toupin, M.; Brousse, T.; Belanger, D. Charge storage mechanism of $MnO_2$ electrode used in aqueous electrochemical capacitor. Chem. Mater. 16, 3184-3190 (2004)

Non-patent document 12: Pang, S. C.; Anderson, M. A.; Chapman, T. W. Novel electrode materials for thin-film ultracapacitors: Comparison of electrochemical properties of sol-gel-derived and electrodeposited manganese dioxide. J. Electrochem. Soc. 147, 444-450 (2000)

Non-patent document 13: Chmiola, J.; Yushin, G.; Gogotsi, Y.; Portet, C.; Simon, P.; Taberna, P. L. Anomalous increase in carbon capacitance at pore sizes less than 1 nanometer. Science 313, 1760-1763 (2006)

Non-patent document 14: Kaempgen, M.; Chan, C. K.; Ma, J.; Cui, Y.; Gruner, G. Printable thin film supercapacitors using single-walled carbon nanotubes. Nano Lett. 9, 1872-1876 (2009)

Non-patent document 15: Pushparaj, V. L.; Shaijumon, M. M.; Kumar, A.; Murugesan, S.; Ci, L.; Vajtai, R.; Linhardt, R. J.; Nalamasu, O.; Ajayan, P. M. Flexible energy storage devices based on nanocomposite paper. Proc. Natl. Acad. Sci. USA 104, 13574-13577 (2007)

Non-patent document 16: Chang, J. K.; Tsai, W. T. Material characterization and electrochemical performance of hydrous manganese oxide electrodes for use in electrochemical pseudocapacitors. J. Electrochem. Soc. 150, A1333-A1338 (2003)

Non-patent document 17: Desilvestro, J.; Haas, O. Metal oxide cathode materials for electrochemical energy storage: A review. J. Electrochem. Soc. 137, C5-C22 (1990)

Non-patent document 18: Wu, M. Q.; Snook, G. A.; Chen, G. Z.; Fray, D. J. Redox deposition of manganese oxide on graphite for supercapacitors. Electrochem. Commun. 6, 499-504 (2004)

Non-patent document 19: Zhu, S.; Zhou, H.; Hibino, M.; Honma, I.; Ichihara, M. Synthesis of $MnO_2$ nanoparticles confined in ordered mesoporous carbon using a sonochemical method. Adv. Funct. Mater. 15, 381-386 (2005)

Non-patent document 20: Man, J.; Fan, Z. J.; Wei, T.; Cheng, J.; Shao, B.; Wang, K.; Song, L. P. Zhang, M. L. Carbon nanotube/MnO$_2$ composites synthesized by microwave-assisted method for supercapacitors with high power and energy densities. J. Power Sources 194, 1202-1207 (2009)

Non-patent document 21: Reddy, A. L. M.; Shaijumon, M. M.; Gowda, S. R.; Ajayan, P. M. Multisegmented Au—MnO$_2$/carbon nanotube hybrid coaxial arrays for high-power supercapacitor applications. J. Phys. Chem. C 114, 658-663 (2010)

Non-patent document 22: Hu, L. B.; Pasta, M.; Mantia, F. L.; Cui, L. F.; Jeong, S.; Deshazer, H. D.; Choi, J. W.; Han, S. M.; Cui, Y. Stretchable, porous, and conductive energy textiles. Nano Lett. 10, 708-714 (2010)

Non-patent document 23: Liu, R.; Lee, S. B. MnO$_2$/poly(3,4-ethylenedioxythiophene) coaxial nanowires by one-step coelectrodeposition for electrochemical energy storage. J. Am. Chem. Soc. 130, 2942-2943 (2008)

Non-patent document 24: Chen, L.; Sun, L. J.; Luan, F.; Liang, Y.; Li, Y.; Liu, X. X. Synthesis and pseudocapactive studies of composite films of polyaniline and manganese oxide nanoparticles. J. Power Sources 195, 3742-3747 (2010)

Non-patent document 25: J. M. Tarascon, M. Armand, Nature 2001, 414, 359

Non-patent document 26: Y. Idota, T. Kubota, A. Matsufuji, Y. Maekawa, T. Miyasaka, Science 1997, 276, 1395

Non-patent document 27: J. Hassoun, S. Panero, P. Simon, P. L. Taberna, B. Scrosati, Adv. Mater. 2007, 19, 1632

Non-patent document 28: K. T. Nam, D. W. Kim, P. J. Yoo, C. Y. Chiang, N. Meethong, P. T. Hammond, Y. M. Chiang, A. M. Belcher, Science 2006, 312, 885

Non-patent document 29: Lee, K. T.; Jung, Y. S.; Oh, S. M. J. Am. Chem. Soc. 2003, 125, 5652-5653

Non-patent document 30: Winter, M.; Besenhard, J. O.; Spahr, M. E.; Novak, P. Adv. Mater. 1998, 10, 725-763

Non-patent document 31: Coward, G. R.; Leroux, F.; Power, W. P.; Ouvrard, G.; Dmowski, W.; Egami, T.; Nazar, L. F. Electrochem. Solid-State Lett. 1999, 2, 367-370

Non-patent document 32: Crosnier, O.; Brousse, T.; Devaux, X.; Fragnaud, P.; Schleich, D. M. J. Power Sources 2001, 94, 169-174

Non-patent document 33: Nazri, G.-A.; Pistoia G. Lithium Batteries Science and Technology; Kluwer: Boston, 2004

Non-patent document 34: I. A. Courtney, J. R. Dahn, J. Electrochem. Soc. 1997, 144, 2045

Non-patent document 35: M. Winter, J. O. Besenhard, Electrochim. Acta 1999, 45, 31

Non-patent document 36: S. Grugeon, S. Laruelle, R. Herrera-Urbina, L. Dupont, P. Poizot, J. M. Tarascon, J. Electrochem. Soc. 2001, 148, A285

Non-patent document 37: E. Shembel, R. Apostolova, V. Nagirny, I. Kirsanova, Ph. Grebenkin, P. Lytvyn, J. Solid St. Electrochem. 2005, 9, 96

Non-patent document 38: N. Li, C. Martin, J. Electrochem. Soc. 2001, 148, A164

Non-patent document 39: M. Wachtler, M. R. Wagner, M. Schmied, M. Winter, J. O. Besenhard, J. Electroanal. Chem. 2001, 12, 510

Non-patent document 40: Y. Yu, L. Gu, C. Zhu, P. A. van Aken, J. Maier, J. Am. Chem. Soc., 2009, 131 15984

Non-patent document 41: Y. Yu, L. Gu, C. Wang, A. Dhanabalan, P. A. van Aken, J. Maier, Angew. Chem. Int. Ed., 2009, 48, 6485

Non-patent document 42: J. O. Besenhard, J. Yang, M. Winter, J. Power Sources 1997, 68, 87

Non-patent document 43: J. Y. Lee, R. Zhang, Z. Liu, Electrochem. Solid-State Lett. 2000, 3, 167

Non-patent document 44: J. Yang, M. Wachtler, M. Winter, J. O. Besenhard, Electrochem. Solid-State Lett. 1999, 2, 161

Non-patent document 45: H. G. Yang and H. C. Zeng, Angew. Chem., Int. Ed., 2004, 43, 5930

Non-patent document 46: S. J. Han, B. C. Jang, T. Kim, S. M. Oh and T. Hyeon, Adv. Funct. Mater., 2005, 15, 1845

Non-patent document 47: J. Hassoun, S. Panero, P. Simon, P.-L. Taberna, B. Scrosati, Adv. Mater. 2007, 19, 1632

SUMMARY OF INVENTION

Problem to be Solved by the Invention

However, manganese dioxide has poor electron conductivity ($10^{-5}$ to $10^{-6}$ S·cm$^{-1}$), which limits charging/discharging speed and impedes use in high-output applications (non-patent document 11; non-patent document 16; non-patent document 17: Desilvestro, J.; Haas, O. Metal oxide cathode materials for electrochemical energy storage: A review. J. Electrochem. Soc. 137, C5-C22 (1990)). The development of manganese dioxide having increased levels of electroconductivity through the use of, for example, carbon (non-patent document 18: Wu, M. Q.; Snook, G. A.; Chen, G. Z.; Fray, D. J., "Redox deposition of manganese oxide on graphite for supercapacitors", Electrochem. Commun. 6, 499-504 (2004); non-patent document 19: Zhu, S.; Zhou, H.; Hibino, M.; Honma, I.; Ichihara, M., "Synthesis of MnO$_2$ nanoparticles confined in ordered mesoporous carbon using a sonochemical method", Adv. Funct. Mater. 15, 381-386 (2005); non-patent document 20: Yan, J.; Fan, Z. J.; Wei, T.; Cheng, J.; Shao, B.; Wang, K.; Song, L. P. Zhang, M. L., "Carbon nanotube/MnO$_2$ composites synthesized by microwave-assisted method for supercapacitors with high power and energy densities", J. Power Sources 194, 1202-1207 (2009); non-patent document 21: Reddy, A. L. M.; Shaijumon, M. M.; Gowda, S. R.; Ajayan, P. M., "Multisegmented Au—MnO$_2$/carbon nanotube hybrid coaxial arrays for high-power supercapacitor applications", J. Phys. Chem. C 114, 658-663 (2010); non-patent document 22: Hu, L. B.; Pasta, M.; Mantia, F. L.; Cui, L. F.; Jeong, S.; Deshazer, H. D.; Choi, J. W.; Han, S. M.; Cui, Y., "Stretchable, porous, and conductive energy textiles", Nano Lett. 10, 708-714 (2010)) or electroconductive polymers (non-patent document 23: Liu, R.; Lee, S. E. "MnO$_2$/poly(3,4-ethylenedioxythiophene) coaxial nanowires by one-step coelectrodeposition for electrochemical energy storage. J. Am. Chem, Soc. 130, 2942-2943 (2008); non-patent document 24: Chen, L.; Sun, L. J.; Luan, F.; Liang, Y.; Li, Y.; Liu, X. X., "Synthesis and pseudocapactive studies of composite films of polyaniline and manganese oxide nanoparticles", J. Power Sources 195, 3742-3747 (2010)) in order to improve electrical conductivity is an important problem.

Tin-based material substances, which are considered to show promise as electrode materials for lithium-ion secondary cells, are problematic in that they exhibit extreme changes in volume, and it is difficult to extend their battery lifespans. Moreover, no reports have been made as of yet regarding the control of changes in volume by controlling the morphology or form of tin, as well as related environmental factors (non-patent documents 40, 41).

Means of Solving the Problem

As the result of diligent research, the inventors focused on nanoporous gold (NPG) manufactured by selectively etching a binary gold/silver alloy, and discovered that, when the ceramic manganese dioxide was deposited upon the surface of a core (NPG) metal using a template technique (plating) involving a liquid phase deposition reaction under controlled conditions, it is possible to make use of the properties of the core skeleton as a template and to coat and/or deposit a ceramic deposit layer upon the surface of the core skeleton, successfully obtaining a nanoporous core/ceramic deposit nanostructure (composite) comprising a gold core having unique structural properties and a ceramic deposit. The inventors also successfully discovered that a nanoporous metal/ceramic composite hybrid material obtained in this manner is a superior functional material, thereby arriving at the present invention.

The inventors similarly succeeded in producing an NPG/$SaO_2$ nanocomposite using three-dimensional nanoporous gold (3D NPG) as a carrier and depositing ceramic $SnO_2$ upon the skeleton of the carrier, and discovered that, when the 3D NPG/$SnO_2$ nanocomposite is used as a lithium-ion battery (LIB) anode material, high reversible capacity is demonstrated during charge/discharge cycles, the problem of changes in volume can be solved, lifetime can be extended, and performance can be increased, thereby arriving at the present invention.

The present invention provides a novel nanoporous metal/ceramic composite material substance by combining chemical dealloying and an electroless plating treatment. In one specific embodiment, the present invention provides a novel nanoporous Au/$MnO_2$ electrode. In the nanoporous Au/$MnO_2$ electrode, three-dimensionally nanoporous gold (3D NPG) is not only active as a double-layer capacitor, but also functions as a good electroconductive agent, enhancing the pseudocapacitor ability of the $MnO_2$. The ceramic (metallic oxide) hybrid material substance of the present invention demonstrates an extremely high specific capacitance, extremely high energy density, and extremely superior cycle stability, and exhibits optimal properties as an electrode material for high-performance super capacitor (SC) devices.

In another specific embodiment, the present invention provides a novel three-dimensional nanoporous gold (3D NPG)/$SnO_2$ composite, as well as a method for manufacturing the same and a LIB using the 3D NPG/$SnO_2$ composite as an anode material.

The present invention provides:

(1) a nanoporous metal core/ceramic deposit layer composite, wherein the nanoporous metal core/ceramic composite is characterized in that the composite has a ceramic deposit and a metal core, and the core is of a nanoporous metal;

(2) the composite according to (1), characterized in that the deposit layer is selected from the group consisting of $MnO_2$, $TiO_2$, $CeO_2$, $Al_2O_3$, $BaTiO_3$, $SnO_2$, $WO_3$, $In_2O_3$, $V_2O_5$, $Nb_2O_5$, $Ta_2O_5$, $TaNbO_5$, $SiO_2$, $ZrO_2$, $LaCoO_3$, $LaCrO_3$, $LaMnO_3$, $LaFeO_3$, $Bi_2O_3$, $SrCoO_3$, $Co_3O_4$, $CuO$, $NiO$, $PrMnO_3$, $SrTiO_3$, $BeO$, $MgSiO_3$, $Mg_2SiO_4$, $Fe_2O_3$, $Fe_3O_4$, $ZnO$, $PbTiO_3$, $RuO_2$, and $CrO_2$;

(3) the composite according to (1) or (2), characterized in that the core is a nanoporous metal, and the ceramic is deposited or adhered upon the surface of the metal of the interpore walls of the nanoporous metal;

(4) the composite according to one of (1) to (3), characterized in that the core is nanoporous gold or nanoporous copper;

(5) the composite according to (4), characterized in that the nanoporous gold is obtained by dealloying a gold/silver alloy;

(6) a method for manufacturing a nanoporous metal core/ceramic deposit layer composite, wherein the method for manufacturing a nanoporous metal core/ceramic composite is characterized in that a nanoporous metal core made of a metal is subjected to a plating treatment, and a ceramic layer is formed upon the surfaces of the interiors of the pores in the core;

(7) a supercapacitor device characterized in that the composite according to any one of claims (1) to (5) is used as an electrode; and (8) a lithium-ion battery characterized in that the composite according to any one of claims (1) to (5) is used as an electrode.

Effects of the Invention

In the present invention, a novel nanoporous metal/ceramic hybrid material substance useful as an electrode material for a high-performance supercapacitor (SC) device or long life lithium-ion battery (LIB), such as a nanoporous gold (NPG)/ceramic hybrid film, is provided. In particular, a nanoporous Au (NPG)/$MnO_2$ hybrid film is useful as an electrode material for a high-performance supercapacitor (SC) device, and a 3D NPG/$SnO_2$ hybrid film has high power storage capacity, and is useful as an electrode material for an ultra-long life LIB. The hybrid material substance according to the present invention demonstrates superior electrical properties, and is useful for a variety of applications as a material used in combination with a variety of electrical/electronic devices, such as dielectrics, SC electrodes, LIB electrodes, energy storage devices, power sources and backup power sources for portable phones and personal computers, power sources and backup power sources for electronic control devices for automobiles, batteries for electric cars, and power storage devices.

Other objects, features, advantages, and aspects of the present invention will be apparent to a person skilled in the art from the following description. However, it should be noted that the matters disclosed in the present specification, including the matters and specific examples described below, indicate a preferred embodiment of the present invention, and are given merely for illustrative purposes. Various changes and/or improvements (or modifications) within the spirit and scope of the present invention disclosed in the present specification will be readily apparent to a person skilled in the art on the basis of knowledge from the following description and other parts of the specification. All reference documents cited in the present specification are cited for explanatory purposes, and the contents thereof should be construed as being included herein as part of the present specification.

BRIEF DESCRIPTION OF DRAWINGS

FIG. 5(a): 5-minute plating treatment. FIG. 5(b): 10-minute plating treatment. FIG. 5(c): 10-minute plating treatment. The Cu peak is for a copper sample holder.

FIG. 9(a) is for a 0-minute $MnO_2$ plating treatment, FIG. 9(b) is for a 5-minute $MnO_2$ plating treatment, and FIG. 9(c) is for a 10-minute $MnO_2$ plating treatment. Measurements were taken at different scanning speeds.

FIG. 11(a) shows the schematic structure of a three-dimensional nanoporous gold (3D NPG) substrate (carrier) prepared by chemically dealloying an $Ag_{65}Au_{35}$ (at. & %) foil. FIG. 11(b) shows the schematic structure of nanocrystalline tin (specifically, nanocrystalline $SnO_2$) trapped and deposited on the surface of the walls of a channel (tunnel) of 3D NPG. FIG. 11(c) is an SEM image of 3D NPG corresponding to FIG. 11(a). FIG. 11(d) is a SEM image for an NPG/Sn composite (specifically, an $NPG/SnO_2$ composite) corresponding to FIG. 11(b).

FIG. 12(a) is an SEM image (plan view) for a 3D $NPG/SnO_2$ composite. FIG. 12(b) is a magnified SEM image of the cross section of a 3D $NPG/SnO_2$ composite. FIG. 12(c) is a TEM image (plan view) of a 3D $NPG/SnO_2$ composite and an inset SAED pattern. FIG. 12(d) is an HRTEM image of a 3D $NPG/SnO_2$ composite. Particles of nanocrystalline tin (specifically, nanocrystalline $SnO_2$) are shown adhered to a 3D NPG substrate (carrier).

FIG. 13(a) shows a voltage profile for 3D $NPG/SnO_2$ composite electrode at a 0.1 C cycle rate. No noteworthy change was observed at different numbers of cycles. FIG. 13(b) shows a voltage profile for 3D $NPG/SnO_2$ composite electrode at various C rates from 0.005 V to 1.0 V. FIG. 13(c) shows a capacity/cycle number curve for a 3D $NPG/SnO_2$ composite electrode when a charge/discharge cycle was performed at a cycle rate of 0.1 C.

DESCRIPTION OF EMBODIMENTS

Figure 1:
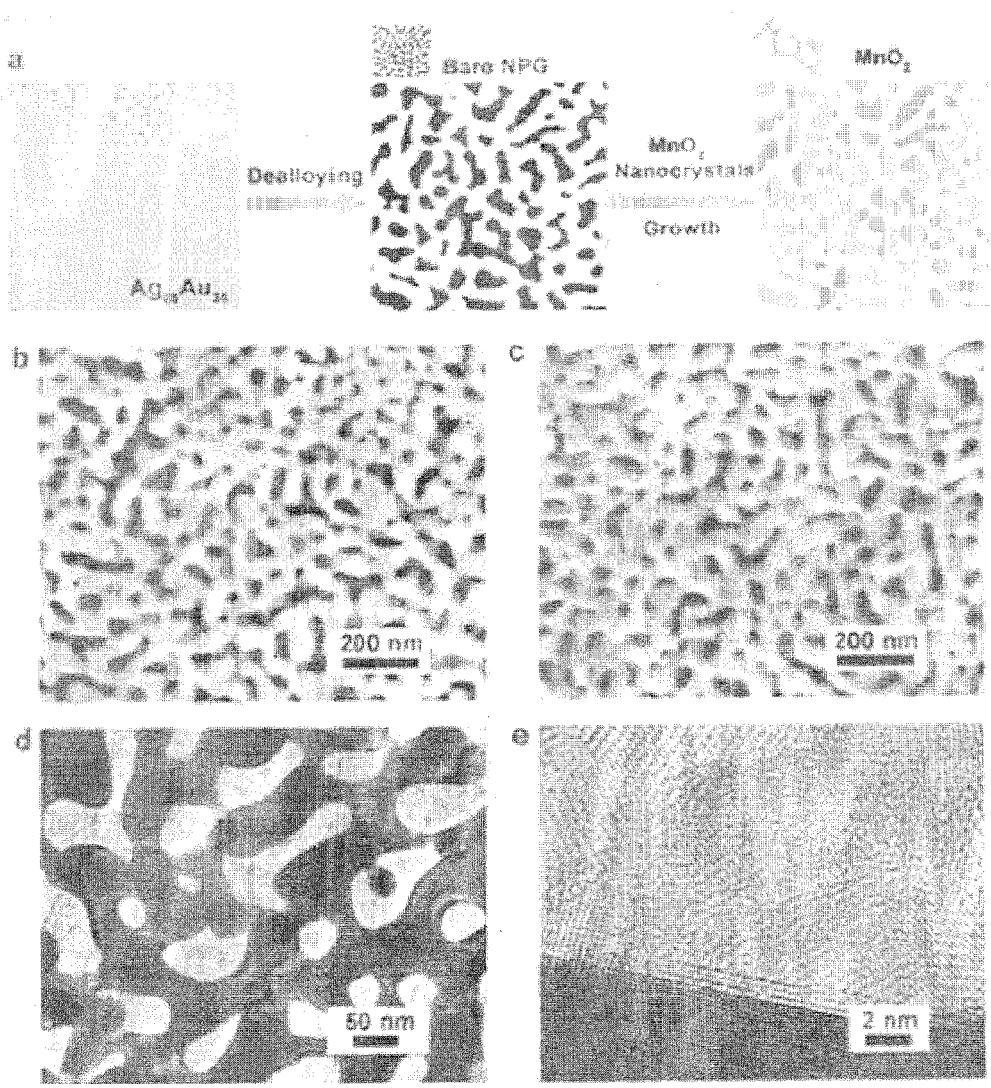
FIG. 1(a) is a schematic illustration of a process of manufacturing a nanoporous Au/ceramic composite material substance, specifically, an NPG/$MnO_2$ composite, combining chemical dealloying and an electroless plating treatment. Bare nanoporous gold is obtained in a first process (dealloying), and $MnO_2$ nanocrystals are grown upon the gold framework substrate via a plating treatment in a subsequent process to obtain the composite material substance.
FIG. 1(b) is an SEM image (plan view) of dealloyed NPG.
FIG. 1(c) is an SEM image (plan view) of an NPG/$MnO_2$ composite obtained after performing a plating treatment for 10 minutes.
FIG. 1(d) is a TEM image of an NPG/$MnO_2$ composite obtained after performing a plating treatment for 20 minutes.
FIG. 1(e) is an HRTEM image of an NPG/$MnO_2$ composite obtained after performing a plating treatment for 20 minutes.

The present invention provides a hybrid material substance in which the surface of a nanoporous metal is modified using a ceramic, as well as a method for manufacturing same. The present invention also provides a technique of modifying the metal surface of a nanoporous metal using a ceramic. In particular, the present invention provides a nanoporous metal/ceramic composite structure of at least two constituents; for example, an at least binary nanoporous metal core/ceramic deposit layer composite thin film (or a ceramic-composite nanoporous metal foil), and a method for manufacturing same. The nanoporous metal core/ceramic composite structure typically has (1) a ceramic deposit layer (shell or film layer) and a core (interior or skeleton) of metal, the skeleton (starter nanoporous metal) being a porous structure having multiple nanosize pores of an average pore size of roughly 80 nm or less, roughly 60 nm or less, in some cases roughly 50 nm or less, especially roughly 40 nm or less, or roughly 30 nm or less, or, for example, roughly 25 nm or less; and the nanoporous metal/ceramic composite structured metal being a nanoporous metal/ceramic composite hybrid substance showing markedly superior electrical properties and/or yield superior capacitor performance and/or having structural properties and/or a shape allowing for SC action to be demonstrated in a device using the substance as an SC electrode or an LIB electrode. Moreover, the substance is a nanoporous metal/ceramic composite hybrid substance having a structural properties and/or a shape allowing for superior charge/discharge cycle properties and/or long-life performance, high charge/discharge capacity-maintaining performance, and the like to be demonstrated when used as an LIB electrode.

The present invention provides an application for a hybrid nanoporous metal/ceramic composite in which a functional nanoporous metal core having an adjusted nanopore size is surface-modified using a ceramic constituting a deposit layer; for example, as a material used in combination with a variety of electrical/electronic devices, such as dielectrics, SC electrodes, lithium-ion batteries (LIES), energy storage devices, backup power sources for portable phones and personal computers, backup power sources for electronic control devices for automobiles, power source devices for automobiles, and power storage devices.

The metal constituting the nanoporous metal core/ceramic composite core can be selected from among various metals, but a metal obtained by dealloying the alloy metals listed below is preferred. Typical examples of the metal constituting the core include gold, a gold-containing alloy, copper, or a copper-containing alloy. Especially preferred examples include nanoporous gold (NPG) and nanoporous copper (NPC).

As used herein, the terms "dealloy," "dealloying," and "selective corrosion" are synonymous, and refer to bringing an alloy metal, alloy metal material, a part thereof, or an alloy metal foil (or alloy metal thin film) into contact with a medium having a corrosive (or etching) action and removing at least one metallic constituent from the alloy metal to form a nanoporous metal, nanoporous material, a part thereof, or a nanoporous metal foil (or nanoporous metal thin film), or to bringing the metal and the corrosive medium into contact for a period of time sufficient to remove at least one metallic constituent from the alloy and form a nanoporous metal (including nanoporous metal thin films).

Examples of such nanoporous metals include metals having a nanoporous structure having an average pore size of about 100 nm or less metals having a nanoporous structure having an average pore size of about 80 nm or less; in some cases, metals having a nanoporous structure having an average pore size of about 70 nm or less; metals having a nanoporous structure having an average pore size of about 60 nm or less; for example, about 50 nm or less; in other cases, metals having a nanoporous structure having an average pore size of about 40 nm or less; metals having a nanoporous structure having an average pore size of about 30 nm or less, for example, about 20 nm or less; more preferably, metals having a nanoporous structure having an average pore size of about 10 nm or less; and especially metals having a nanoporous structure having an average pore size of about 8 nm or less, for example, about 5 nm or less.

As used herein, "metal foil" may refer to a thin sheet of a metal alloy and/or a thin film of a metal alloy. There is no particular limit upon the thickness of the metal foil as long as the desired objects can be achieved; typically, the film may have a thickness of about 50 nm or more; or about 50 μm or less; about 10 μm or less; about 5.0 μm or less; about 2.5 μm or less, for example, 2.0 μm or less; or about 1.5 μm or less, for example, about 1.0 μm or less. Naturally, the metal foil may also have a thickness of about 0.5 μm or less, or about 0.1 μm or less. The alloy used to manufacture the metal foil may comprise two or more metal elements as constituents. The alloy used to manufacture the nanoporous metal constituting the framework (core) comprises at least two metal elements as constituents, in which, for example, one of the two metal elements is a metal element that is sensitive to a corrosive medium, and the other is a metal element that is resistant to the corrosive medium. Moreover, one of the two metal elements has higher ionization energy or ionization potential than the other, or the other of the two metal elements may have a lower ionization potential than the first metal element.

The combination of metals (metal elements) used to obtain the starter material alloy for the core can be one in which the metal have different chemical properties so as to allow for dealloying. Examples of metal elements include elements selected from the group consisting of transition metal elements, typical metal elements, and the like; for example, iron group elements, platinum group elements, copper group elements, zinc group elements, aluminum group elements, manganese group elements, chromium group elements, earth-acid elements, titanium group elements, rare earth elements, alkali earth metal elements, alkali metal elements, lanthanide elements, actinide elements, tin, lead, germanium, bismuth, antimony, and the like. The alloy may contain a typical non-metal element, examples including carbon group elements, nitrogen group elements, oxygen group elements, halogens, boron, and the like.

Suitable alloys are not limited thereto, and may include constituents selected as appropriate from among those known to a person skilled in the relevant field of art, such as gold (Au), silver (Ag), copper (Cu), zinc (Zn), aluminum (Al), nickel (Ni), tin (Sn), manganese (Mn), iron (Fe), cobalt (Co), chromium (Cr), molybdenum (Mo), tungsten (W), vanadium (V), niobium (Nb), titanium (Ti), zirconium (Zr), magnesium (Mg), platinum (Pt), palladium (Pd), ruthenium (Ru), rhodium (Rh), osmium (Os), iridium (Ir), and the like. More specific examples of alloys include Au—Ag alloys, Au—Cu alloys, Cu—Mn alloys, Cu—Al alloys, Cu—Zn alloys, Cu—Mg alloys, Ni—Al alloys, Ni—Mg alloys, Ni—Mn alloys, Cu—Cr alloys, Sn—Pb alloys, Sn—In alloys, Ag—Cu alloys, Au—Ni alloys, Au—Pd alloys, and the like. Preferred alloys that can be dealloyed to obtain a nanoporous metal include Au—Ag alloys, Cu—Mn alloys, Cu—Zn alloys, and the like, of which Au—Ag alloys and Cu—Mn alloys are especially preferred.

In the present invention, the alloy constituting the starter substance is preferably in the form of a metal foil or the like. The alloy foil preferably has a thickness of about 50 nm to about 50 μm, about 50 nm to about 10 μm, more preferably about 60 nm to about 5.0 μm, about 70 nm to about 1.0 μm, still more preferably about 80 nm to about 500 nm, or about 90 nm to about 250 nm. Specific preferred examples include a metal alloy foil having a thickness of about 90 nm to about 150 nm, or a metal alloy foil having a thickness of about 100 nm.

In one embodiment of the present invention, the metal alloy may contain the constituent metal elements at various proportions (percentages). For example, in the case of a gold/silver alloy (Au—Ag alloy), the alloy may contain about 50% to about 80% gold (Au) and a remainder of silver (Ag). A more preferred example is an alloy containing gold and silver at proportions of about 35 at % gold and about 65 at % silver, i.e., a 35Au-65Ag alloy. The metal foil is prepared, for example, in the following manner. The metal elements of the alloy material are mixed, placed in a crucible, heated, and melted, after which a thin film can be obtained via a melt spinning method. Alternatively, the molten metal mixture can be poured into a mold and cooled to obtain an alloy ingot. Next, the alloy is drawn into a strip shape, then cut into chips using a guillotine device. The obtain alloy sheet chips (strips) are placed on foil paper in several overlapping layers, hammered, and cut, and this hammering process is repeated to obtain a metal foil. A commercially available metal foil can also be used, and foils having various thickness or gold/silver ratios are obtainable.

In another embodiment of the present invention, an alloy of, for example, copper and manganese (a Cu—Mn alloy) is used, in which case the alloy contains, for example, 10% to about 70% copper (Cu), with the remainder being manganese (Mn). A more preferred example is an alloy containing copper and manganese at proportions of about 30 at % Cu and about 70 at % manganese, i.e., a 30Cu-70Mn alloy. A metal foil is prepared in a manner similar to that used with the gold/silver alloy. A commercially available metal foil can also be used, and foils having various thickness or copper/manganese ratios are obtainable.

The medium exhibiting corrosive (or etching) action used in the present invention is capable of selectively dissolving at least one of the metals constituting the metal alloy. The composition of the corrosive medium can be selected as appropriate according to the type of metal alloy to be dealloyed. If the alloy contains two or more constituent metal elements, at least one of the constituent metal elements is dissolved. An example of a preferred corrosive medium is an acid. Examples of acids suitable for the present invention include organic acids and inorganic acids. A preferred example is an inorganic acid, and more preferred examples include mineral acids such as nitric acid, sulfuric acid, hydrochloric acid, and perchloric acid. In one preferred embodiment of the present invention, the acid is nitric acid or hydrochloric acid. A single acid or a mixture of acids may be used. The corrosive medium may be in a concentrated or a diluted form. If an Au—Ag alloy is used, an about 70% nitric acid aqueous solution can preferably be used, or a stronger or weaker solution can be used. If a Cu—Mn alloy is used, an about 0.025 M hydrochloric acid aqueous solution can preferably be used, or a stronger or weaker solution can be used.

In accordance with one embodiment of the present invention, the treatment, i.e., dealloying of the alloy constituting starter material by the corrosive medium can be performed at room or lower temperature, but the present invention is not limited thereto, and a higher temperature also possible. The dealloying can be more preferably performed at room temperature in the case of an Au—Ag alloy or Cu—Mn alloy. In a preferred embodiment of the present invention, the dealloying is performed at a temperature of about 100° C. to about −45° C., more preferably about 50° C. to about 0° C. The dealloying can be performed for an arbitrarily selected length of time, but is preferably performed for an amount of time sufficient to remove at least one of the metallic constituents from the alloy and form a nanoporous metal. In a preferred embodiment of the present invention, the dealloying may be performed for about 30 minutes to about 48 hours, preferably for about 1 hour to about 20 hours. The dealloying treatment temperature and treatment time can be selected as appropriate according to the target nanoporous metal.

The present invention provides a method for manufacturing a nanoporous metal/ceramic composite (nanoporous metal/ceramic hybrid substance). In this manufacturing method, a metal nanoporous metal core (skeleton) is subjected to a precipitation (deposition) reaction or to a plating treatment (electroless plating) to form (or deposit) a ceramic deposit upon the surfaces of the interior of the pores in the core. The deposit-forming reaction is effected by performing in situ precipitation (deposition) of a ceramic (for example, a metallic oxide) upon the metal constituting the skeleton (for example, gold in the case of nanoporous gold (NPG)), thereby depositing and/or forming a ceramic layer (packed layer) on the surface of the core. Typically, the nanoporous metal constituting the core functions as a template and as a carrier (self-sustaining substrate), and imparts the obtained composite with the feature of nanoporosity. The metallic oxide or other ceramic is deposited on the surface of the core metal at the surface of the core so as to cover the surface of the core and/or be packed or precipitated in the channels (tunnels) within the porous body, thereby advancing the deposit-forming reaction filling the channels (tunnels) present in the metal skeleton of the framework with the ceramic component. A nanoporous composite retaining the structural characteristics (nanoporous structure) of the core is thus obtained.

The plating treatment can be performed by immersing the nanoporous metal substrate constituting the core into a ceramic source-containing liquid containing a source of the metal ions constituting the ceramic. A water-based or aqueous solution is typically favorably used as the ceramic source-containing liquid. As shall be apparent, it is also possible to use a mixture of water and an organic solvent. A water-miscible organic solvent can be used, examples including alcohols, ethers, ketones, acid amides, carboxylic acids, esters, nitriles, dioxanes, and saturated nitrogenous heterocycles. The plating treatment can be one in which a ceramic is applied to the metal surfaces of the channels (tunnels) in the nanoporous metal substrate via electrolytic deposition, electroless deposition, liquid phase deposition, or the like. In one specific embodiment, the plating treatment can be effected by immersing the nanoporous metal constituting the core in a ceramic source-containing liquid containing a source of metal ions constituting the ceramic in the presence of a reductant, oxidizing agent, acid, alkali, or the like selected as necessary at a predetermined temperature for a predetermined amount of time while stirring. Examples of ceramic sources include chloride compounds of the metal, complex compounds of the metal, and solutions containing the same, such as metal peroxides, halides, nitrates, sulfates, organic acid salts, cyanide, and other compounds, and amino complexes, chloride complexes, fluoro complexes, and other complex compounds. If a fluoro complex is used as the ceramic source, the formation of a metallic oxide can be promoted by adding boric acid, metallic aluminum, or water to or raising the temperature of a metal fluoro complex. In a method in which, for example, a solution of a metal peroxide such potassium permanganate is subjected to a reduction treatment, it is possible to use, for example, a reductant such as hydrazine, formaldehyde, or the like. It is also possible to apply a method known as a sol-gel method in the relevant field of art to form the ceramic.

Typical ceramic sources include elements selected from the group consisting of transition metal elements, typical metal elements, and the like; for example, iron group elements, platinum group elements, copper group elements, zinc group elements, aluminum group elements, manganese group elements, chromium group elements, earth-acid elements, titanium group elements, rare earth elements, alkali earth metal elements, alkali metal elements, lanthanide elements, actinide elements, tin, lead, germanium, bismuth, antimony, and the like. The ceramic source may contain a typical nonmetal element, examples including carbon group elements, nitrogen group elements, oxygen group elements, halogens, boron, and the like.

Suitable ceramics are not limited thereto, and a suitable ceramic may be selected as appropriate from among those known to a person skilled in the relevant field of art; examples include oxides containing metals selected from: manganese (Mn), aluminum (Al), titanium (Ti), zirconium (Zr), beryllium (Be), magnesium (Mg), silicon (Si), antimony (Sb), yttrium (Y), copper (Cu), zinc (Zn), nickel (Ni), tin (Sn), iron (Fe), cobalt (Co), chromium (Cr), molybdenum (Mo), tungsten (W), vanadium (V), niobium (Nb), tantalum (Ta), rhenium (Re), gold (Au), silver (Ag), platinum (Pt), palladium (Pd), ruthenium (Ru), rhodium (Rh), osmium (Os), iridium (Tr), barium (Ba), and germanium (Ge); lanthanides such as lanthanum (La), cerium (Ce), praseodymium (Pr), samarium (Sm), europium (Eu), gadolinium (Gd), terbium (Tb), and ytterbium (Yb); actinides; and the like.

Typical, non-limiting examples of ceramics include $MnO_2$, $TiO_2$, $CeO_2$, $Al_2O_3$, $BaTiO_3$, $SnO_2$, $WO_3$, $In_2O_3$, $V_2O_5$, $Nb_2O_5$, $Ta_2O_5$, $TaNbO_5$, $SiO_2$, $ZrO_2$, $LaCoO_3$, $LaCrO_3$, $LaMnO_3$, $LaFeO_3$, $Bi_2O_3$, $SrCoO_3$, $PrMnO_3$, $SrTiO_3$, $BeO$, $MgSiO_3$, $Mg_2SiO_4$, $Fe_2O_3$, $Fe_3O_4$, $ZnO$, $PbTiO_3$, $RuO_2$, $CrO_2$, and the like. A particular example of a ceramic is a pseudocapacitative material, with various materials such as $MnO_2$, $TiO_2$, $CeO_2$, $SnO_2$, and the like being known one of which can be selected as long as no particular pejorative effect is yielded.

In a specific embodiment of the present invention, nanoporous gold (NPG) is modified (embellished) using a ceramic. For example, an aqueous solution of potassium permanganate can be used to deposit $MnO_2$ on the surfaces of the interior walls of the channels in the pore of the NPG, a reductant such as hydrazine preferably being added to the potassium permanganate aqueous solution. The potassium permanganate concentration of the potassium permanganate aqueous solution can be selected as appropriate in order to obtain the target $MnO_2$ layer; for example, the concentration is roughly 0.01 to 1.0 M, preferably roughly 0.05 to 0.20 M, most preferably roughly 0.1 M. The hydrazine concentration of the potassium permanganate aqueous solution can be selected as appropriate in order to obtain the target $MnO_2$ layer. The amount of $MnO_2$ adhering to the surface of the NPG can also be altered by controlling the reaction time; for example, if a 0.01M potassium permanganate aqueous solution is used in the presence of hydrazine, the reaction time is roughly 5 to 120 minutes, preferably roughly 5 to 35 minutes, and most preferably roughly 20 minutes. The amount of ceramic adhering to the surface of the NPG can also be altered by controlling reaction conditions such as the metal ion concentration of the ceramic source, the reductant/dispersing agent/surfactant if one is added, reaction time, and the like.

If $SnO_2$ or the like is deposited on the surface of the interior walls of the channels of the pores in the NPG, a tin chloride aqueous solution may be used, for example, to add a reductant such as hydrazine, deposit tin nanocrystals, then convert the nanocrystals to nanocrystalline $SnO_2$ by placing the NPG in an oxygenated environment such as an electrolytic solution or air. The $SnCl_2$ concentration can be selected as appropriate in order to obtain the target $SnO_2$ layer; for example, the concentration is roughly 0.01 to 2.0 M, preferably roughly 0.1 to 1.0 M, most preferably roughly 0.5 M. The hydrazine concentration of the tin chloride aqueous solution can be selected as appropriate in order to obtain the target $SnO_2$ layer. The reaction time can be selected as appropriate in order to obtain the desired results; for example, the reaction time is roughly 5 minutes to 30 hours, preferably from 5 to 18 hours, more preferably from 10 to 14 hours, and most preferably 12 hours.

The metal surface of the nanoporous metal of the core obtained according to the method of the present invention typically has a core nanoporous metal base structure containing a plurality of nanosized (from about 1 nm to about 100 nm) holes (or pores, channels, or tunnels), in which case the holes maintain a so-called open, bicontinuous nanoporous morphology, in which the holes have at least an opening and are continuous in two directions. Typically, the nanoporous metal of the core manufactured via dealloying as described above is used as a template, and thus retains structural properties reflecting the skeleton structure of the core. The core nanoporous metal/ceramic composite hybrid substance will have a core nanoporous metal base structure having a plurality of pores of sizes in a range from about 1.5 nm to about 80 nm, preferably a core nanoporous metal base structure having a plurality of pores of sizes in a range from about 2 nm to about 70 nm, more preferably a core nanoporous metal base structure having a plurality of pores of sizes in a range from about 2.5 nm to about 60 nm, a core nanoporous metal base structure having a plurality of pores of sizes in a range from about 3 nm to about 50 nm, a core nanoporous metal base structure having a plurality of pores of sizes in a range from about 3 nm to about 40 nm, a core nanoporous metal base structure having a plurality of pores of sizes in a range from about 3 nm to about 30 nm, or a core nanoporous metal base structure having a plurality of pores of sizes in a range from about 3 nm to about 20 nm. Typically, the abovementioned pore sizes indicate the average size. The abovementioned pore sizes may also indicate diameter size.

Typically, the portion of the core nanoporous metal/ceramic composite hybrid substance derived from the core nanoporous metal having the plurality of holes (or pores) is derived from holes having the sizes described above and communicates with the interior to form interior tunnels, and these tunnels normally communicate with each other to form a labyrinth-like core nanoporous metal-derived based structure. In a preferred instance, the nanoporous metal has a plurality of holes having an average hole length of about 12 nm or more, a plurality of holes having an average hole length of about 14 nm or more, preferably a plurality of holes having an average hole length of about 16 nm or more, more preferably a plurality of holes having an average hole length of about 18 nm or more, a plurality of holes having an average hole length of about 15 nm to about 50 nm, more preferably a plurality of holes having an average hole length of about 20 nm or more, still more preferably a plurality of holes having an average hole length of about 22 nm or more, or a plurality of holes having an average hole length of about 24 nm or more.

The core nanoporous metal/ceramic composite typically reflects the skeletal structure of the nanoporous metal used as a cast and retains a core nanoporous metal-derived base structure having interpore walls (ligaments, tunnel walls, or skeleton) having widths in a range from about 2 nm to about 80 nm, ligaments having widths in a range from about 2.5 nm to about 50 nm in some instances, ligaments having widths in a range from about 2.5 nm to about 45 nm, ligaments having widths in a range from about 3 nm to about 40 nm, ligaments having widths in a range from about 3 nm to about 35 nm, more preferably ligaments having widths in a range from about 3.5 nm to about 30 nm, ligaments having widths in a range from about 4 nm to about 20 nm, more preferably ligaments having widths in a range from about 5 nm to about 10 nm, ligaments having widths in a range from about 3 nm to about 8 nm, or ligaments having widths in a range from about 3 nm to about 5 nm. In a different embodiment, the nanoporous metal/ceramic composite obtained according to the method of the present invention typically has ligaments having widths in a range from about 5 nm to about 10 nm, preferably ligaments having widths in a range from about 5 nm to about 15 nm, more preferably ligaments having widths in a range from about 5 nm to about 20 nm, ligaments having widths in a range from about 5 nm to about 25 nm, preferably ligaments having widths in a range from about 5 nm to about 35 nm, more preferably ligaments having widths in a range from about 5 nm to about 45 nm, or ligaments having widths in a range from about 5 nm to about 50 nm. Typically, the abovementioned ligament sizes indicate the average size.

Figure 6:
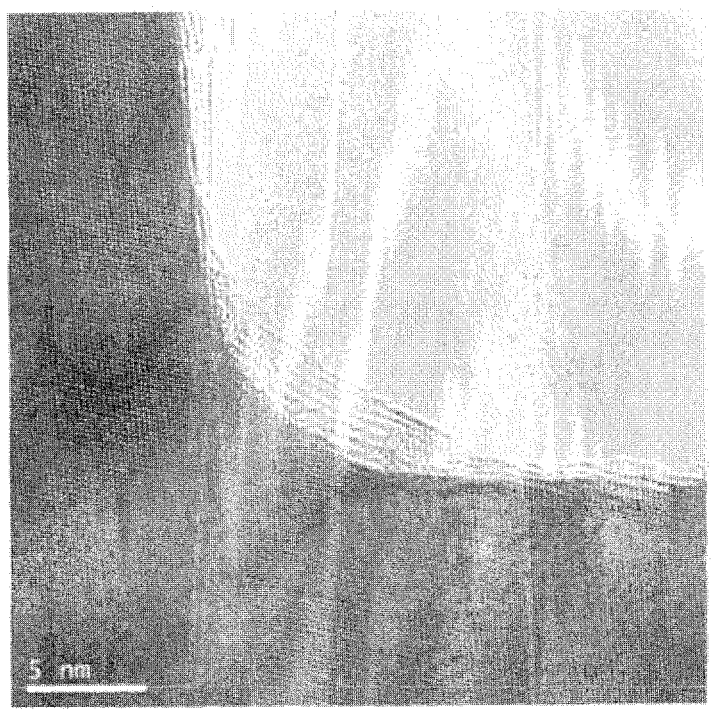
FIG. 6 is an HRTEM image of an $NPG/MnO_2$ composite obtained after performing a plating treatment on $MnO_2$ for 5 minutes.

The size of the ligaments may refer to the thickness (diameter) of the walls of the pores (or tunnels). In a preferred instance, the nanoporous metal/ceramic composite has a plurality of ligaments having an average length (or tunnel wall length) of about 11 nm or more, a plurality of ligaments having an average length (or tunnel wall length) of about 12 nm or more in some instances, preferably a plurality of ligaments having an average length (or tunnel wall length) of about 13 nm or more, and more preferably a plurality of ligaments having an average length (or tunnel wall length) of about 15 nm or more, or a plurality of tunnel walls having an average length of about 15 nm to about 50 nm, more preferably a plurality of tunnel walls having an average length of about 16 nm or more, preferably a plurality of tunnel walls having an average length of about 17 nm or more, or a plurality of tunnel walls having an average length of about 18 nm or more. The ligaments are constituted by the metal and other components remaining after dealloying. A typical nanoporous metal/ceramic composite has the features shown in FIGS. 1 and 6.

In the nanoporous metal/ceramic composite, the surfaces of the ligaments are covered by a layer (or film) or ceramic, or ceramic is deposited (or packed) thereupon. Under observation, the ceramic layer may substantially uniformly cover the surfaces of the ligaments, and can cover the surfaces of the interior walls of the tunnels extending into the interior or be packed into the interior of the tunnels. The thickness of the ceramic layer film (deposit) can be controlled using a variety of methods.

In accordance with one embodiment of the present invention, the nanoporous metal/ceramic composite is in the form of a thin film, and films of various thicknesses can be manufactured. The thickness of the nanoporous metal may different according to the thickness of the alloy starter material used.

In accordance with one embodiment of the present invention, the nanoporous metal/ceramic composite is in the form of an extremely fragile thin film, and is therefore normally handled or used mounted on a substrate (or base plate) (i.e., supported by the substrate). In a preferred embodiment of the present invention, the substrate has a flat-surfaced sheet or sheet-like form. In another preferred embodiment of the present invention, the substrate may have a convex surface, a concave surface, a spherical shape, a cylindrical shape, or an alternatingly convex and concave surface. In a typical instance, the substrate is a sheet of paper or the like, a glass sheet, a silicon sheet, a resin sheet, a ceramic sheet, or the like. In accordance with an embodiment of the present invention, the substrate can be made from a variety of materials. For example, the substrate can be manufactured from glass, ceramic, an insoluble metal, graphite or another carbonaceous material, rubber, nylon, an acrylic resin, polyethylene, a polymer material such as a polyethylene terephthalate resin, or another substance.

In accordance with one embodiment of the present invention, a ceramic@nanoporous gold (ceramic@NPG) composite can be synthesized using a template method involving a liquid phase deposition method, and the composite can be used as a material for a supercapacitor (SC) and/or a material for a lithium-ion battery (LIB). Specifically, a nanoporous gold/ceramic structure can be provided using nanoporous gold (NPG) having a plurality of open holes and a plurality of bicontinuous holes as a base frame via a simple in situ wet metallurgical method. A ceramic (for example, $MnO_2$ or another pseudocapacitative material substance) is placed on the surfaces of the interpore walls of the NPG, thereby allowing for the controlled deposition of a ceramic layer of suitable thickness. It has been discovered that, using a reductant such as hydrazine and or other additives, the ceramic layer formation reaction speed can be controlled, and three-dimensional nanoporosity can be maintained throughout the ceramic formation reaction (plating treatment). Thus, a technique using the same is also provided. The obtained porous nanocomposite exhibited effects as a dramatically superior supercapacitor electrode material compared to NPG in its unmodified manufactured state. It has also been discovered that the factors increasing these effects are strongly dependent upon the length of the ceramic-applying reaction. The use of these is also within the scope of the present invention. The present invention is markedly useful in improving the functionality of a nanoporous metal structure, and can be used to develop a highly economical electrode material for an ultra-high performance SC device. The present invention can similarly be used to develop an electrode material for an ultra-long life LIB.

In the present invention, the surface of the framework (interpore walls, ligaments) of an NPG skeleton is thus plated with a ceramic layer (thin layer), forming a nanoporous core/ceramic composite structure, which can be used to further improve the functionality, such as the pseudocapacitative ability, of the ceramic. The present invention shows that a composite hybrid structure featuring a core of nanoporous gold (NPG) that has open, bicontinuous holes and is porous, and a ceramic applied to the surface (including the interior surfaces of the tunnels) thereof can be manufactured using a liquid phase deposition method. The ceramic layer, the amount of which deposited can be controlled, can be deposited upon the surfaces of the walls present in the spaces within the NPG. The NPG is used as a template and self-supporting substrate. The formed nanoporous metal/ceramic composited exhibits dramatically superior SC effects. The present invention can be used to develop a metal/ceramic composite nanostructure taking advantage of the structure of three-dimensionally porous metal or a highly economical SC material for ultra-high performance devices.

In accordance with another embodiment of the present invention, a ceramic $MnO_2$@nanoporous gold composite constituting a three-dimensional structure can be provided, the $MnO_2$@nanoporous gold composite exhibiting dramatically superior electrical properties and being useful. Specifically, a nanoporous gold-$MnO_2$ (NPG/$MnO_2$) composite of a hybrid material can be manufactured using a simple liquid phase deposition method. The ceramic $MnO_2$ can be deposited on the surfaces of the gold atoms in the interpore walls of the NPG acting as the template. The composite nanostructure having the $MnO_2$ deposit exhibits superior energy density and power density in an SC device, and demonstrates cycle stability.

In the present invention, nanoporous gold produced by selectively etching a binary gold/silver alloy is used as a nanoporous template for manufacturing a nanoporous gold-$MnO_2$ (NPG/$MnO_2$) composite. Because the interior surfaces of the NPG are modified using $MnO_2$, a template method involving an electroless plating (chemical plating) method, can be developed using the present invention, and used to manufacture an NPG/$MnO_2$ composite having a nanoporous metal skeleton/ceramic deposit composite structure. The NPG is used then as a template and self-supporting substrate. The properties of the nanoporous gold-$MnO_2$ (NPG/$MnO_2$) composite arise from its unique core/shell structure. In this way, the inventors have succeeded in manufacturing a ceramic composite nanostructure deposited among the skeleton of a nanoporous metal having a plurality of open, bicontinuous holes using a template method involving a liquid phase deposition reaction. The novel NPG/$MnO_2$ electrode of the present invention exhibits superior performance in a high-performance SC device.

In the present invention, a novel nanoporous gold (NPG)/ceramic hybrid film is provided that is useful as an electrode material for a high-performance supercapacitor (SC). In particular, a nanoporous Au (NPG)/$MnO_2$ hybrid film is useful as an electrode material for a high-performance supercapacitor (SC) device. In the hybrid film according to the present invention, the highly electroconductive and nanoporous NPG of the skeleton improves and promotes electron transport and ion diffusion into the $MnO_2$, and functions as an electrical double-layer capacitor.

In the present invention, an NPG/$SnO_2$ nanocomposite in which three-dimensional nanoporous gold (3D NPG) is used as a carrier and the ceramic $SnO_2$ is deposited (or precipitated) onto the skeleton of the carrier is provided. The 3D NPG/$SnO_2$ nanocomposite can be manufactured by dealloying an alloy, and subsequently performing an electroless plating treatment. Upon testing the NPG/$SnO_2$ nanocomposite as an electrode for a lithium-ion battery (LIB), the special Sn (or $SnO_2$) structure of the nanocomposite was found to effectively enable large changes in volume between cycle treatments in the lithium-ion battery, yielding more superior capacity maintenance. The electrode exhibited a high reversible capacity of 620 mAh/g after 140 cycles at 0.1 C. A high capacity of 260 mAh/g was obtained even at a rate of 8 C. In this way, the three-dimensional nanoporous metal/ceramic composite according to the present invention is extremely promising as an anode material of high storage ability for a lithium battery. In a lithium-ion secondary cell in which the three-dimensional nanoporous metal/ceramic composite is used as an electrode, the problem of changes in volume can be solved, the problem of reduced capacity can be improved, and a long cycle life can be obtained.

The present invention will be described in detail hereafter with reference to examples, but these examples are offered merely for the purposes of describing the present invention and as reference for specific embodiments thereof. The examples describe specific concrete embodiments of the present invention, but do not limit or restrict the scope of the invention disclosed herein. In the present invention, it is to be understood that various embodiments are possible based on the concepts set forth in the specification.

Except where otherwise stated, all examples were or could be implemented using the standard art known to and commonly used by a person skilled in the art.

EXAMPLE 1

Synthesis of Substrate and Nanoporous Gold (NPG) as Template

A thin foil of $Ag_{65}Au_{35}$ (subscript numbers indicate atomic ratio) acting as a precursor substance ($Ag_{65}Au_{35}$ foil, size up to 20 mm×20 mm×100 nm) was manufactured by repeated the hammering process. The $Ag_{65}Au_{35}$ foil was selected etched at room temperature for 8 hours in a 70% nitric acid ($HNO_3$) aqueous solution to manufacture nanoporous gold (NPG). The dealloyed NPG sample was rinsed at least five times in purified water (18.2 MΩ·cm) to remove the remaining chemical substances. Regarding nanoporous gold, see Fujita, T.; Okada, H.; Koyama, K.; Watanabe, K.; Maekawa, S.; Chen, M. W., "Unusually small electrical resistance of three-dimensional nanoporous gold in external magnetic fields", Phys. Rev. Lett. 101, 166601 (2008); and Erlebacher, J.; Aziz, M. J.; Karma, A.; Dimitrov, N.; Sieradzki, K., "Evolution of nanoporosity in dealloying", Nature 410, 450-453 (2001).

Structure of NPG/$MnO_2$ Nanocomposite

The ceramic $MnO_2$ was formed covering the interpore walls (ligaments) of the NPG. Thus, the interior surfaces of the 3D NPG were modified (chemically plated) using a wet ceramic formation technique. A 0.1 mM $KMnO_4$ aqueous solution (pH=9-10) was used as the wet-method chemical solution used to form the ceramic $MnO_2$, the as-synthesized NPG film was immersed in the aqueous solution while being magnetically stirred, a reductant was added thereto, and treatment was performed at room temperature for 5 minutes, 10 minutes, and 20 minutes to obtain NPG/$MnO_2$ nanocomposite films. Hydrazine ($NH_2NH_2$) gas was used as the reductant.

Analysis of Microstructural Characteristics

The microstructure and chemical composition characteristics of the as-synthesized NPG and NPG/$MnO_2$ composite were analyzed using a field emission scanning electron microscope (SEM; JEOL JSM-7001 F, 15 keV) equipped with an Oxford X-ray energy dispersive spectroscope (EDS) and a Cs-corrected transmission electron microscope (TEM; JEOL 2100 F, 200 keV).

The as-synthesized NPG and porous NPG/$MnO_2$ nanocomposite were placed upon holey carbon TEM grids for TEM analysis.

Construction of Supercapacitor Device

A supercapacitor device was constructed as follows.

A polyethylene (PE) film (membrane; approx. 40 μm thick) coated using a 50 nm-thick gold film (thin film) was used as a conductive plate. Clean, as-synthesized NPG and a porous NPG/$MnO_2$ nanocomposite film were applied upon the PE film as an electrode and a current collector.

Two sheets of dealloyed bare NPG or two sheets of NPG/$MnO_2$ composite were disposed with a piece of cotton paper (about 40 μm thick, Bemliese) sandwiched therebetween as a separator. The overall thickness of the supercapacitor (SC) device was about 120 μm.

Analysis of Electrochemical Properties of NPG/$MnO_2$ Composite

All electrochemical measurements were taken using two typical IviumStat electrochemical analyzers (Ivium Technologies) of an IviumStat electrochemical workstation (Ivium Technologies) constituting an potentiostat/galvanostat manufactured by Ivium Technologies in the Netherlands at room temperature. A charging/discharging test was performed in cyclic voltammetry (CV) and galvanostatic modes in order to investigate the electrochemical activity of the SC device.

CV measurement was performed at different scanning speeds at electrical potentials in a range from 0 to 0.8 V. The charging/discharging process performed by the galvanostat was performed at repeated cycles at different current densities and electrical potentials from 0 to 0.83 V in a 2M $Li_2SO_4$ aqueous solution. Cycle stability over more than 1,000 cycles was checked via a charging/discharging test in galvanostatic mode at a current density of 1 A/g.

Results and Analysis

Nanoporous Structure of Nanoporous Gold/Ceramic Composite

A 100 nm-thick $Au/MnO_2$ composite film constituting a nanoporous gold/ceramic composite was manufactured according to the two-step process conceptually illustrated in FIG. 1a, namely, by dealloying an Ag—Au alloy using nitric acid to produce electroconductive nanoporous gold, followed by precipitating (plating) nanocrystalline $MnO_2$ constituting within the nanoporous channels (reticulated passages or nanoporous conduits) thereof.

Figure 5:
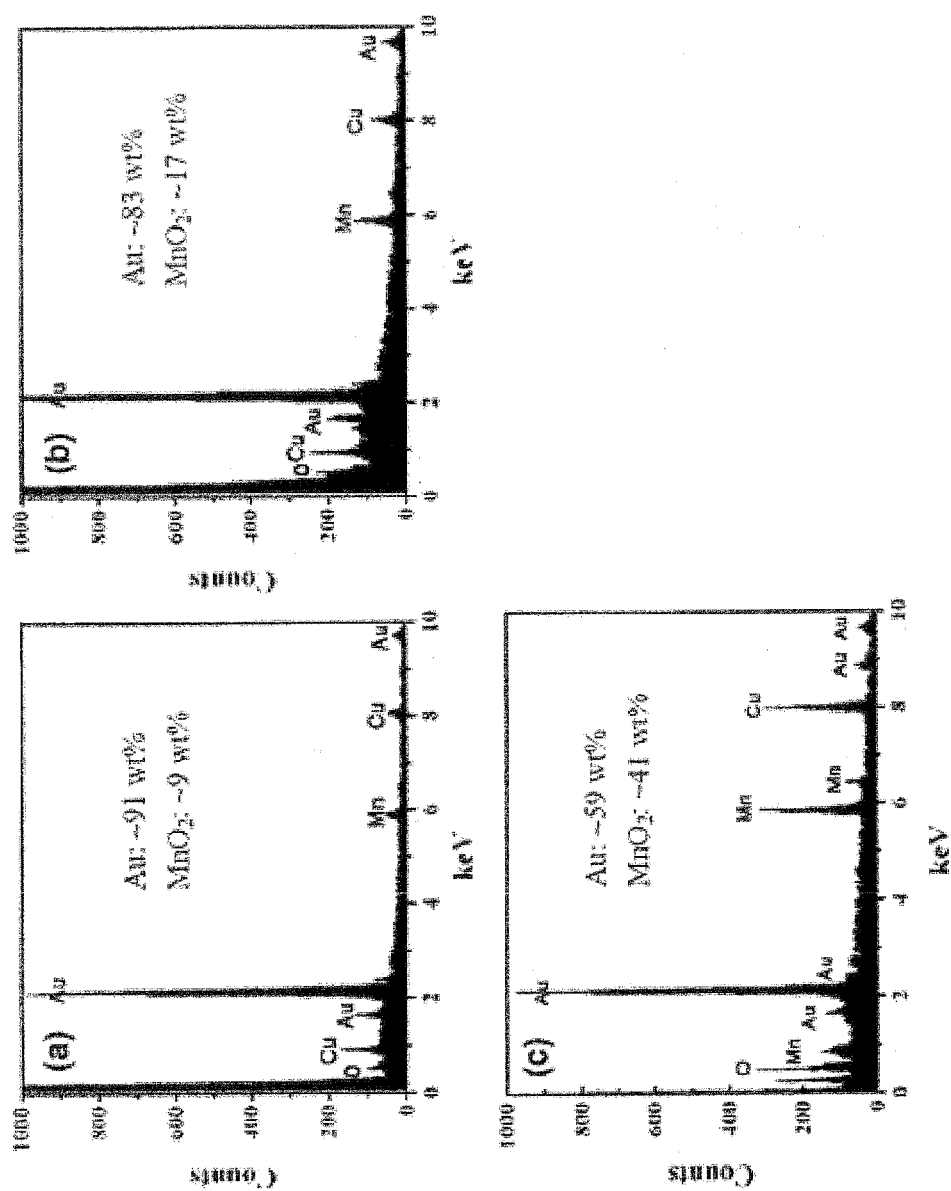
FIG. 5 shows EDS spectra for nanoporous Au/ceramic composite material substances, i.e., $NPG/MnO_2$ composites.

The dealloyed bare NPG exhibited nanopore channels having a characteristic length of about 40 nm and a porous structure of bicontinuous holes constituted by quasi-periodic gold ligaments (FIG. 1b) in a typical scanning electron microscope (SEM) image. The nanocrystalline $MnO_2$ was observed to be uniformly plated within the nanopore channels of the NPG (FIG. 1c). Adjusting plating treatment time allowed the amount of $MnO_2$ deposited to be controlled. This was confirmed using energy dispersive X-ray spectroscopy (EDS) to perform chemical analysis of the $Au/MnO_2$ composite (FIG. 5).

Figure 7:
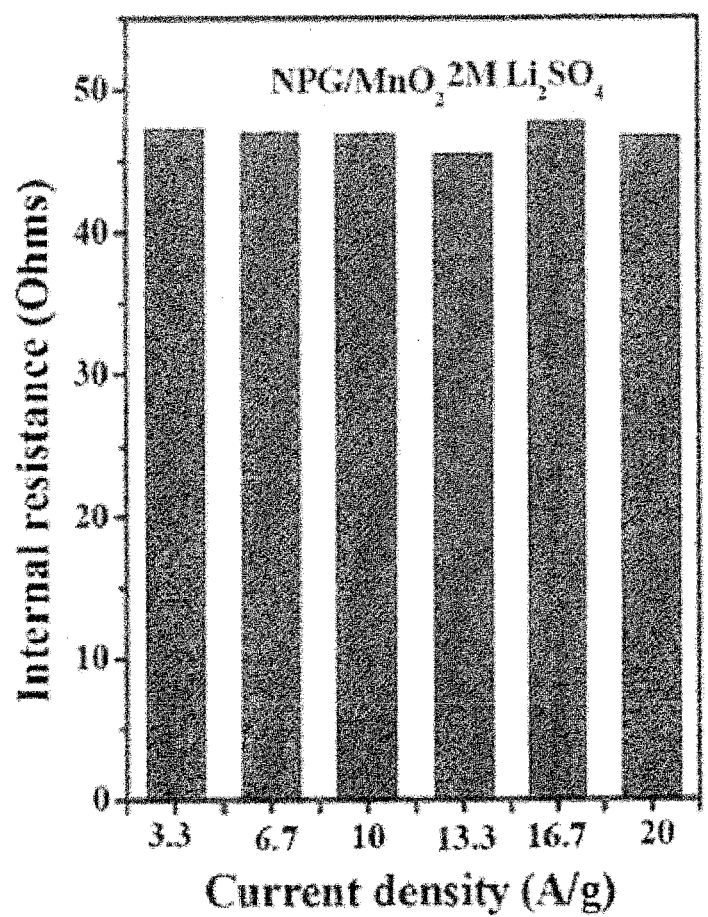
FIG. 7 shows measured internal resistance values for an $NPG/MnO_2$ (20-minute plating treatment) composite electrode according to the present invention. Values are for a 2M $Li_2SO_4$ aqueous solution (electrolyte solution). Measurements were taken using discharge currents of 3.3, 6.7, 10, 13.3, 16.7, and 20 A/g.

A transmission electron microscope (TEM) image of an $Au/MnO_2$ composite film obtained using a 20-minute plating treatment showed that the nanoporous channels (FIG. 1d) were filled with about 5 nm-diameter nanocrystals of $MnO_2$ (FIG. 1e). As shown by high-resolution TEM images (FIGS. 6 and 1e) of $MnO_2$ grown for five minutes and 20 minutes, respectively, the interface structure showed good contact between the nanocrystalline $MnO_2$ and the gold ligaments, thereby imparting the hybrid system as a whole with superior electrical conductivity (FIG. 7).

Electrochemical Properties of Nanoporous Gold/Ceramic Composite

Figure 2:
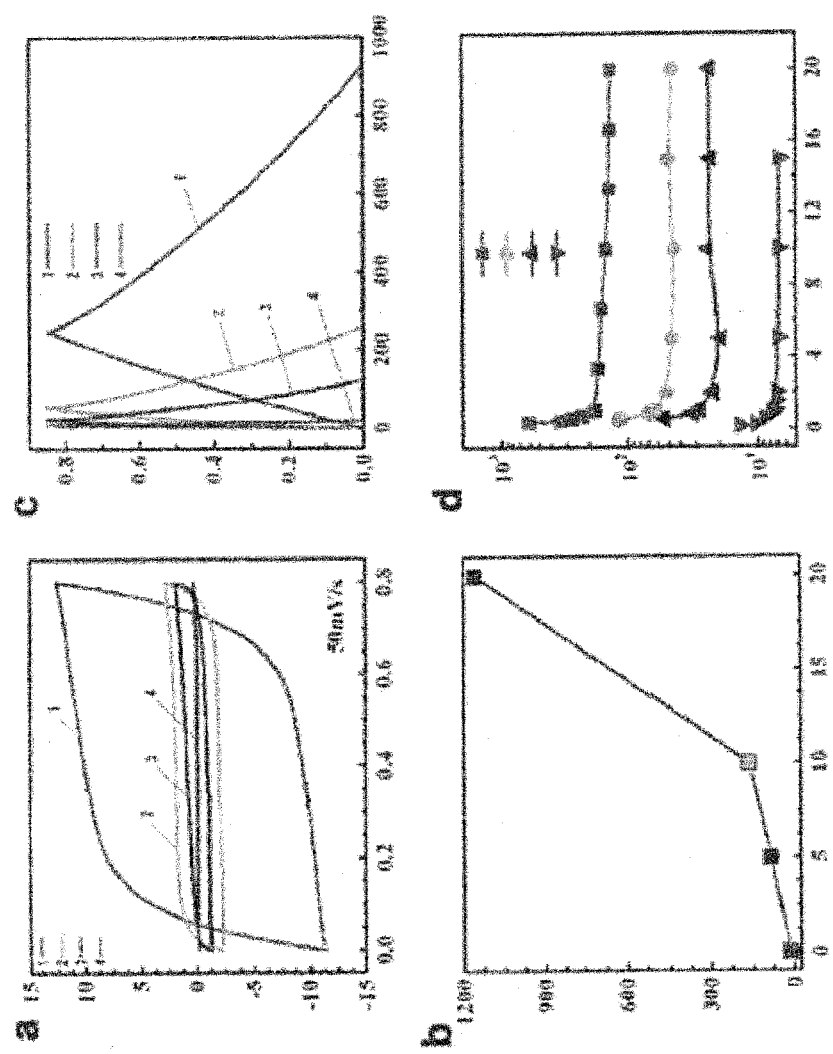
FIG. 2(a) is a cyclic voltammogram of NPG/ceramic composite material substances according to the present invention, i.e., NPG/$MnO_2$ composites, obtained using dealloyed (bare) NPG and various plating treatment times. Measurements were taken at room temperature in an aqueous solution of 2M $Li_2SO_4$. The scanning speed was 50 mV/s.
FIG. 2(b) shows volumetric capacitance as a function of plating treatment time. Capacitance was calculated from CV at a scanning speed of 50 mV/s.
FIG. 2(c) shows charge/discharge curves at a current density of 0.5 A/g for aqueous solution SCs using an electrode of dealloyed (bare) NPG and electrodes using NPG/ceramic composite material substances, i.e., $NPG/MnO_2$ composites, according to the present invention obtained using various plating treatment times.
FIG. 2(d) shows the specific capacitances at various discharge current densities of aqueous solution SCs using an electrode of dealloyed (bare) NPG and electrodes using NPG/ceramic composite material substances, i.e., $NPG/MnO_2$ composites, according to the present invention obtained using various plating treatment times.
Figure 8:
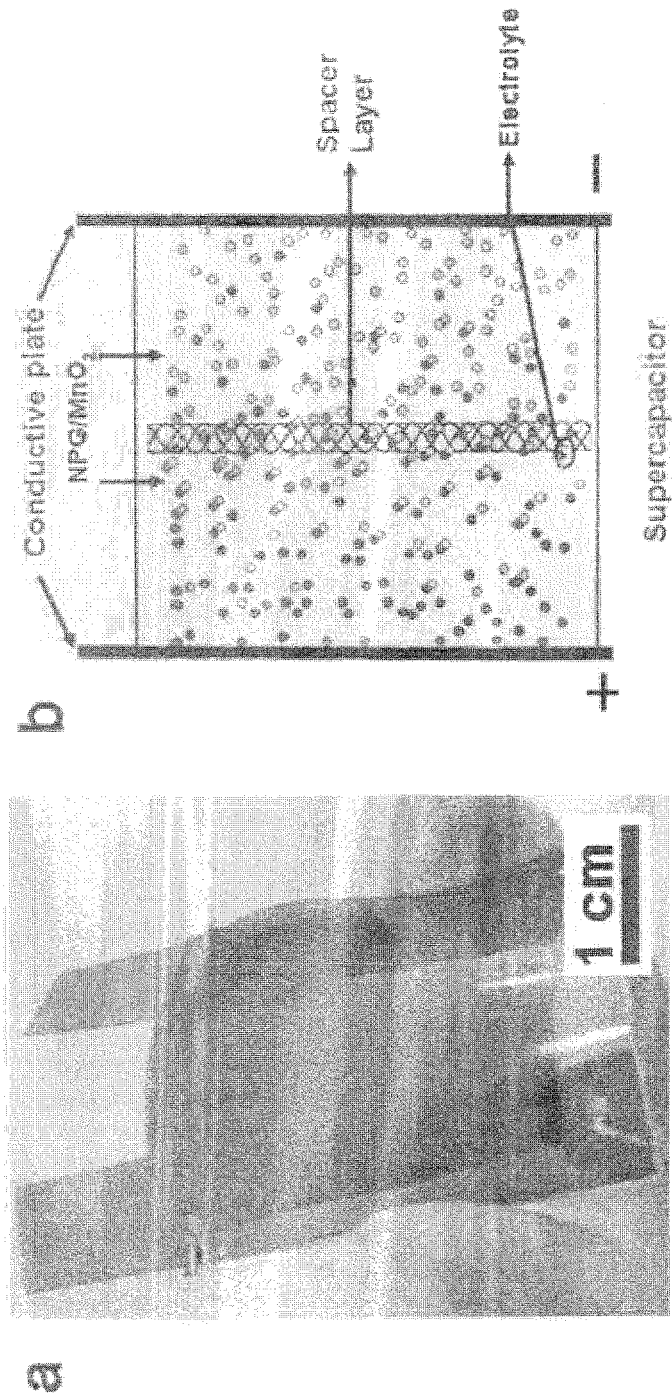
FIG. 8(a) is a photograph of the exterior appearance of a thin-film supercapacitor (SC) constructed using an $NPG/MnO_2$ composite sheet according to the present invention as an electrode. An $Li_2SO_4$ aqueous solution was used as the electrolyte, and tissue paper was used as the separator.
FIG. 8(b) is a schematic illustration of the structure of a nanoporous Au/ceramic composite SC, specifically, an $NPG/MnO_2$ SC, according to the present invention.

The electrochemical properties of the nanoporous $Au/MnO_2$ composite film were tested and investigated using an active charge storage electrode a simplified device configuration (FIG. 8) using two sheets of thin $Au/MnO_2$ composite film as electrodes, a piece of cotton paper as a separator, and a 2M $Li_2SO_4$ aqueous solution as an electrolyte. The overall thickness of the SC device was about 120 µm. FIG. 2a shows a typical cyclic voltammetry (CV) image at a scan speed of 50 mV/s of the supercapacitor (SC), in which, in the two-electrode structure, a dealloyed bare NPG film and a nanoporous $Au/MnO_2$ composite film were used as electrodes. FIG. 2a shows that, in the case of the nanoporous $Au/MnO_2$ composite, the $MnO_2$ nanoparticles engaged in a rapid, reversible, continuous surface redox reduction, thereby yielding a perfect, symmetrical rectangular shape. The lack of a redox peak shows that the SC performed charging and discharging at a roughly constant speed in all voltammetric cycles. The current density per unit of weight of the nanoporous $Au/MnO_2$ composite was considerably greater than that of the SC assembled using the dealloyed bare NPG film as an electrode, and, when the plating treatment time was increase to increase the amount of pseudocapacitative $MnO_2$, there was an increase in capacitance as plating treatment time increased (FIG. 2b). Thus, the capacitor performance of an $NPG/MnO_2$ SC is strongly dependent upon the amount of $MnO_2$ deposited, and can be dramatically improved by taking on a pseudocapacitative substance. This can be confirmed by a typical linear voltage/time profile of the SC charging and discharging at a current density of 0.5 A/g (FIG. 2c). The discharge time increased dramatically as the $MnO_2$ plating time was increased, suggesting that increased $MnO_2$ plating leads to the ability to store greater amounts of electricity.

FIG. 2d shows the specific capacitance (Cs) of an $NPG/MnO_2$ SC as a function of applied current density. Cs is calculated from a discharge curve according to the following formula 1, and i is the applied current.

$$C_s = t/[-(\Delta V/\Delta t)m] \qquad \{\text{Formula 1}\}$$

The following formula 2 shows the slope of the discharge curve after the drop in voltage at the beginning of each discharge, and m is the mass of the NPG or $NPG/MnO_2$ on one electrode.

$$-\Delta V/\Delta t \qquad \{\text{Formula 2}\}$$

The specific capacitance of the $NPG/MnO_2$ at different currents far exceeded the specific capacitance of the dealloyed bare NPG SC, and longer $MnO_2$ plating treatments yielded greater specific capacitance. Although gold is a heavy element, an $NPG/MnO_2$ electrode plated with $MnO_2$ for 20 minutes yielded a high specific capacitance of about 601 F/g (based on the combined mass of NPG and $MnO_2$). This value was considerably higher than the about 385.4 F/g shown by an $MnO_2$/carbon nanotube (CNT; Zhou, Y. K.; He, B. L.; Zhang, F. B.; Li, H. L. Hydrous manganese oxide/carbon nanotube composite electrodes for electrochemical capacitors. J. Solid State Electrochem. 8, 482-487 (2004)), the about 210 F/g shown by $MnO_2$/poly(3,4-ethylenedioxythiophene) (PEDOT; Liu, R. et al., J. Am. Chem. Soc. 130, 2942-2943 (2008)), the about 415 F/g shown by $MnO_2$/polyaniline (Chen, L. et al., J. Power Sources 195, 3742-3747 (2010)), and the about 427 F/g shown by a $MnO_2$/CNT/PEDOT-poly (styrene sulfonate) ternary composite (Hou, Y.; Cheng, Y. W.; Hobson, T.; Liu J. Design and synthesis of hierarchical $MnO_2$ nanospheres/carbon nanotubes/conducting polymer ternary composite for high performance electrochemical electrodes. Nano Lett. 10, 2727-2733 (2010)). As current density increased from 0.5 A/g to 20 A/g, the specific capacitance decreases to about 170 F/g and stayed at that value. The value was still comparable to that of $MnO_2$/CNT, or of an electroconductive polymer hybrid electrode at high current density.

Figure 3:
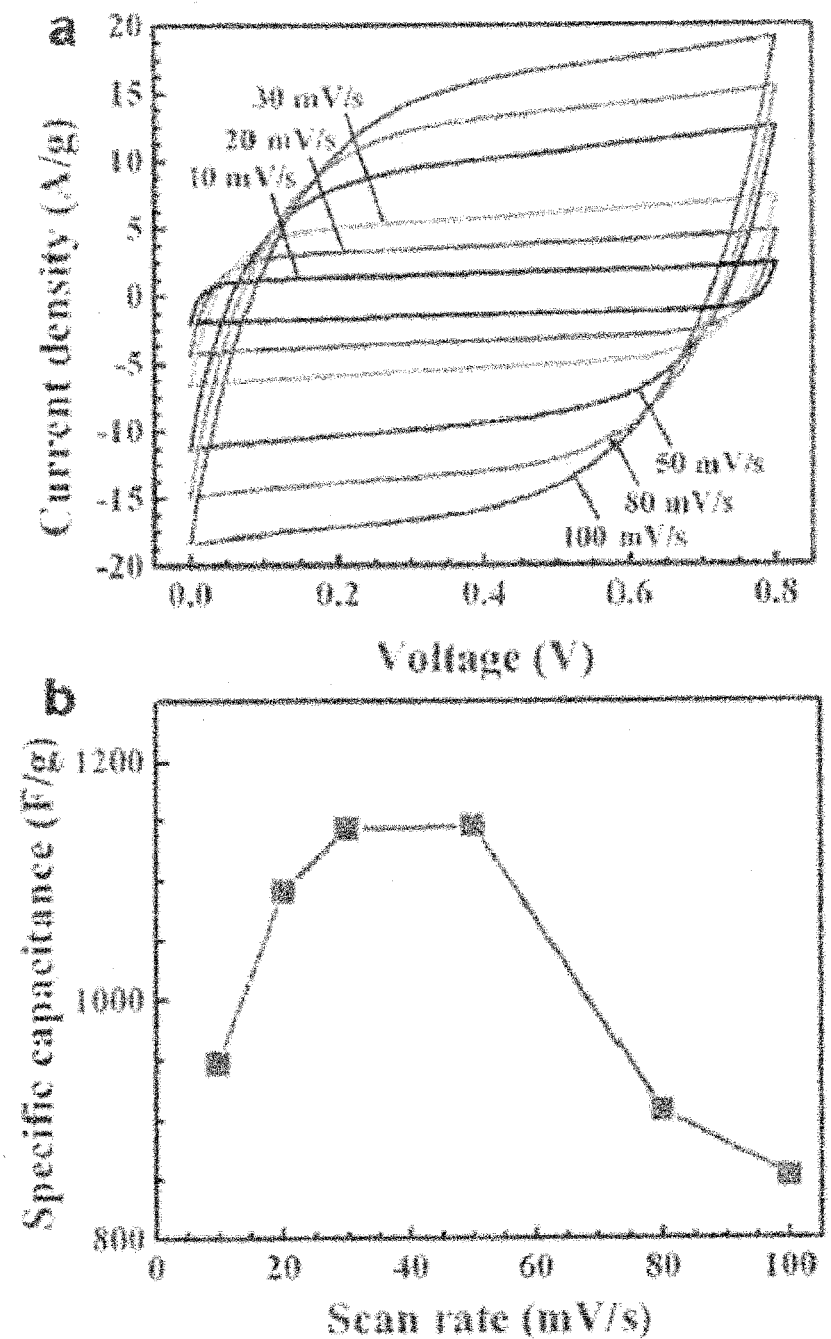
FIG. 3(a) shows the scanning speed dependency of a cyclic voltammogram at various scanning speeds from 10 to 100 mV/s of an electrode of the NPG/ceramic composite electrode according to the present invention, i.e., an electrode of an $NPG/MnO_2$ composite (20 minute plating treatment).
FIG. 3(b) shows the equivalent specific capacitances of $MnO_2$ deposited via plating treatment as a function of scanning speed.
Figure 9:
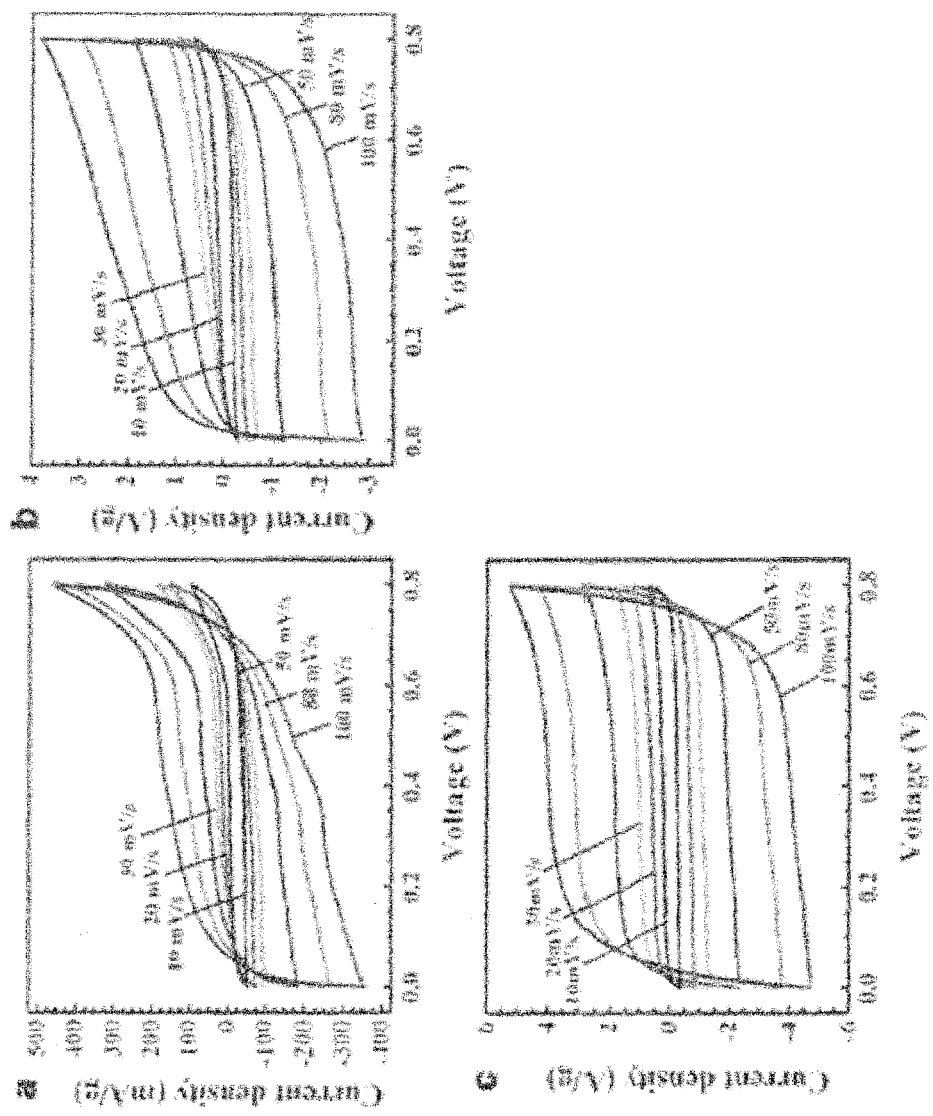
FIG. 9 shows CV curves for supercapacitors (SC) (aqueous solution electrolyte) based on an $NPG/MnO_2$ composite electrode according to the present invention.
Figure 10:
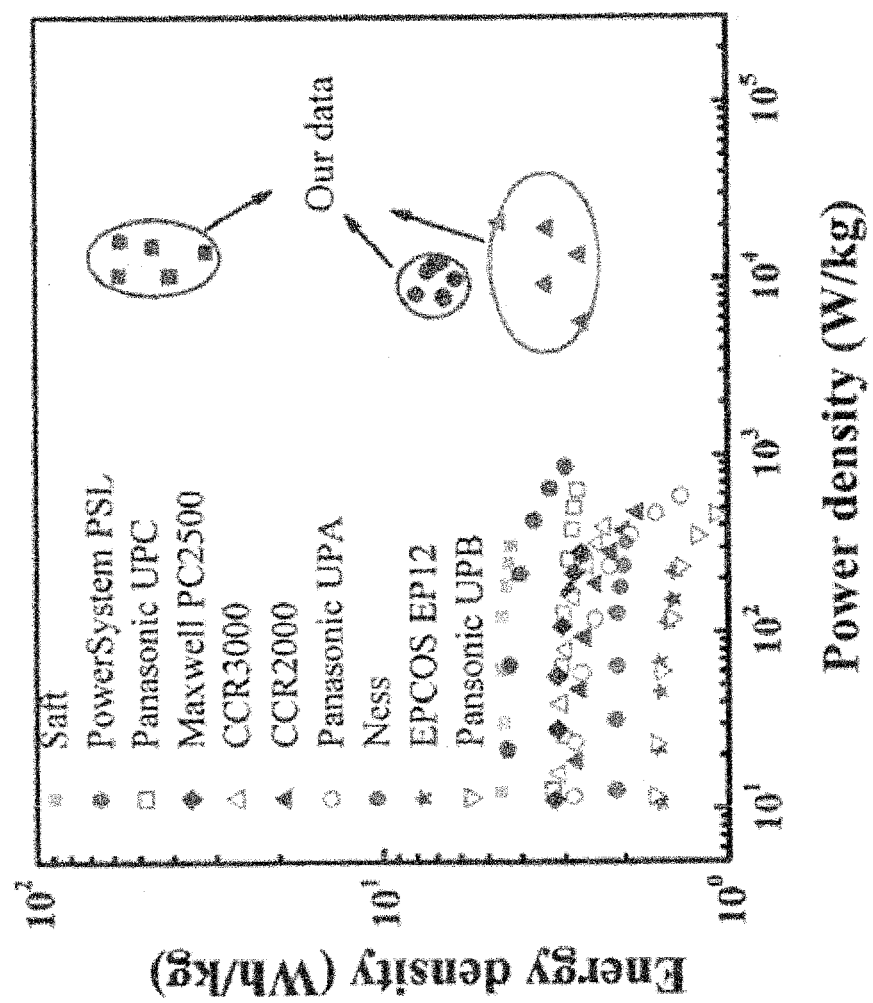
FIG. 10 shows a Ragone plot for $NPG/MnO_2$ supercapacitors (SCs) according to the present invention and commercially available SCs.

The effects of scan speed upon the CV responsiveness of the $NPG/MnO_2$ electrode were investigated over a range from 10 to 100 mV/s, as shown in FIG. 3a and FIG. 9. It can be observed from FIG. 3a and FIG. 9 that current increased as scanning speed increased for all electrodes. No attentionworthy change in the shape of the CV curve was discovered even at high scanning speeds. An $NPG/MnO_2$ electrode plated for 20 minutes exhibited an extremely high volumetric capacitance of about 1,160 $F/cm^3$ at a scanning speed of 50 mV/s, a value far higher than the values hitherto reported: 246

F/cm³ at a scanning speed of 10 mV/s for a multiwall carbon nanotube (MWCNT)/MnO₂, electrode, 156 F/cm³ at a scanning speed of 2 mV/s for a carbon/MnO₂ electrode (Fischer, A. E.; Saunders, M. P.; Pettigrew, K. A.; Rolison, D. R.; Long, J. W. Electroless deposition of nanoscale MnO₂ on ultraporous carbon nanoarchitectures: correlation of evolving pore-solid structure and electrochemical performance. J. Electrochem. Soc. 155, A246-A252 (2008)), and 132 F/cm³ at a scanning speed of 50 mV/s for an MWCNT electrode (Lee, S. W.; Kim, B. S.; Chen, S.; Shao-Horn, Y.; Hammond, P. T. Layer-by-layer assembly of all carbon nanotube ultrathin films for electrochemical applications. J. Am. Chem. Soc. 131, 671-679 (2009)).

In order to rate the effects of MnO₂ upon the electrochemical performance of the NPG/MnO₂ electrode, the charge of the skeleton of the dealloyed bare NPG was subtracted and the specific capacitance of the MnO₂ in each of the electrodes calculated according to the following formula 3.

$$C_{s,MnO2}=(Q_{NPG/MnO2}-Q_{NPG})/(\Delta V m_{MnO2}) \quad \{Formula\ 3\}$$

In the formula, $Q_{NPG/MnO2}$ indicates the volumetric charge of the NPG/MnO₂, $Q_{NPG}$ indicates the volumetric charge of the NPG electrode, $\Delta V$ indicates the width of the electrical potential window, and $m_{MnO2}$ indicates the mass of deposited MnO₂.

As shown in FIG. 3b, the specific capacitance of the MnO₂ increased as scanning speed dropped to 100-50 mV/s, reaching a maximum value of about 1,145 F/g at a scanning speed of 50 mV/s. This value was about 83% of the theoretical value (about 1,370 F/g), the highest ever observed in an SC. This superior specific capacitance is likely due to the unique microstructure of the electrode structure, in which the nanocrystalline MnO₂ is supported by a highly electroconductive, porous gold network structure allowing for the easy and efficient access of electrons and ions.

Figure 4:
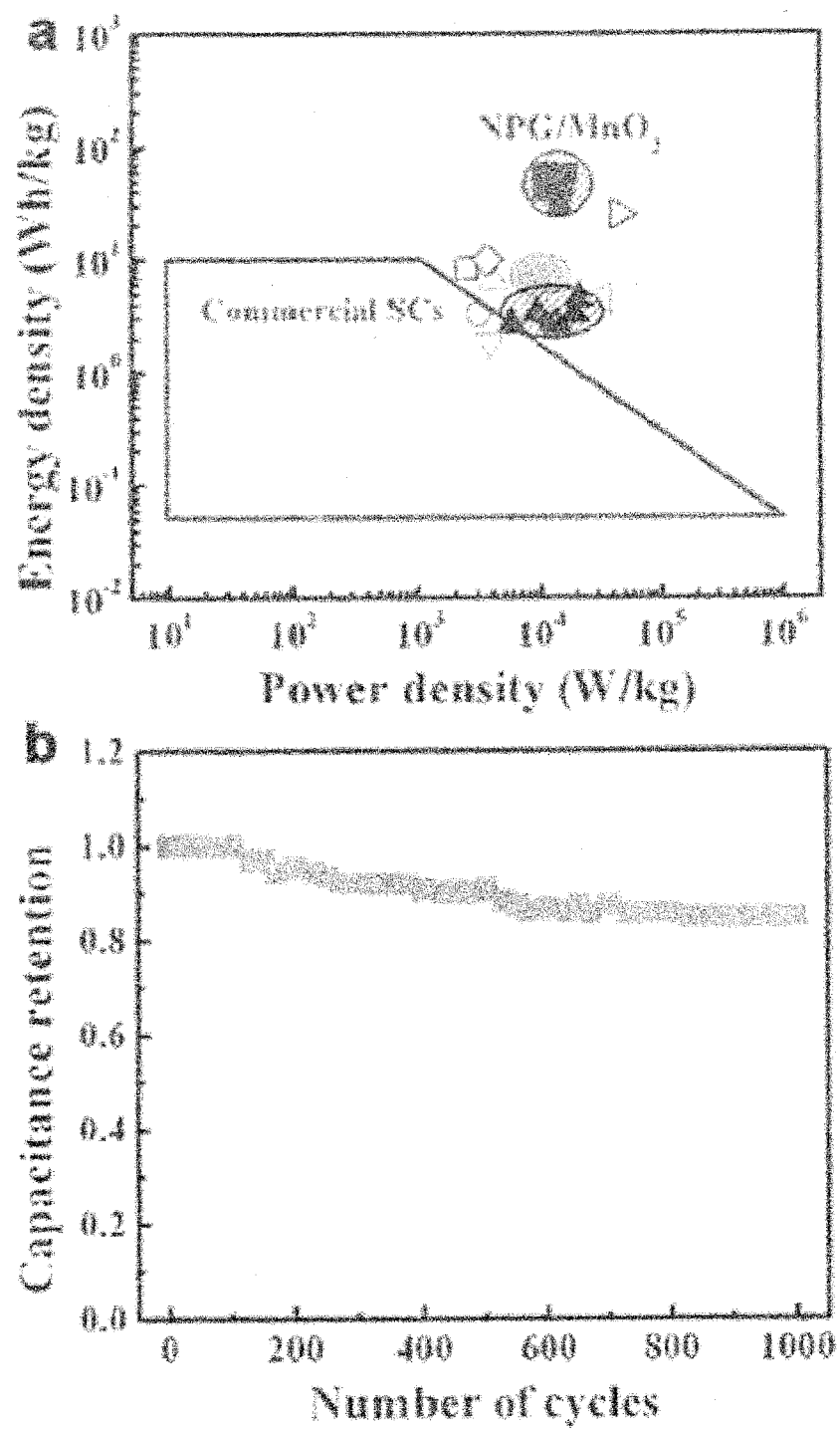
FIG. 4(a) shows a Ragone plot (energy density over power density) for an $NPG/MnO_2$ supercapacitor (SC). Values are for a 2M $Li_2SO_4$ aqueous solution. ▲: 5-minute plating treatment, ●: 10-minute plating treatment, ■: 20-minute plating treatment. For comparison, data from documents discussing other $MnO_2$ electrodes is also plotted. Specifically, an $MnO_2$ electrode (energy density: power density, 3.3 Wh/kg, 3.1 kW/kg, ○, □), a coaxial $CNT/MnO_2$ electrode (2.9 Wh/kg, 11 kW/kg, ▼), an $Au-CNT/MnO_2$ array (4.5 Wh/kg, 33 kW/kg, ▷), an activated charcoal-$MnO_2$ hybrid electrode (7.6 Wh/kg, 4.1 kW/kg, ◇, △, ▽), a $CNT/MnO_2$ composite electrode (25.2 Wh/kg, 45.4 kW/kg, ◁), and a commercially available supercapacitor.
FIG. 4(b) shows the cycle stability of the $NPG/MnO_2$ (20-minute plating treatment) composite electrode according to the present invention as a function of number of cycles.

FIG. 4a shows a Ragone plot (power density P over energy density E) for an SC device using an NPG/MnO₂ electrode. The P and E per unit of weight were calculated as $P=V^2/(4RM)$ and $E=0.5CV^2/M$. In the formulas, V is cutoff voltage, C is the measured capacitance of the device, M is the total mass of the NPG electrode or the total mass of the NPG/MnO₂ electrode, $R=\Delta V_{IR}/(2i)$, and $V_{IR}$ is the drop in voltage between the first two points in the voltage drop at top cutoff. As shown by the plot, the specific energy and the specific power density of the NPG/MnO₂ SC both increased along with the amount of deposited MnO₂, and a 20-minute MnO₂ plating treatment yielded the highest values at about 57 Wh/kg for energy density and about 16 kW/kg for power density. This high level of energy density far outstrips that of a commercially available device having the same power density. A comparison with other MnO₂ electrodes showed that the NPG/MnO₂ (20-minute plating treatment) electrode showed a high energy density at maximum power density, roughly 2 to 20 times those shown by the MnO₂ electrodes reported in the documents as being the best, namely, an MnO₂ electrode (3.3 Wh/kg, 3.1 kW/kg; Cottineau, T.; Toupin, M.; Delahaye, T.; Drousse, T.; Belanger, D., "Nanostructured transition metal oxides for aqueous hybrid electrochemical supercapacitors", Appl. Phys. A 82, 599-606 (2006)), a coaxial CNT/MnO₂ and Au-CNT/MnO₂ array (2.9 Wh/kg, 11 kW/kg; 4.5 Wh/kg, 33 kW/kg; Reddy, A. L. M. et al., J. Phys. Chem. C 114, 658-663 (2010)) an activated charcoal-MnO₂ hybrid electrode (7.6 Wh/kg, 4.1 kW/kg; Brousse, T.; Toupin, M.; Belanger, D., "A hybrid activated carbon-manganese dioxide capacitor using a mild aqueous electrolyte", J. Electrochem. Soc. 151, A614-A622 (2004); Xu, C. J.; Du, H. D.; Li, B. H.; Kang, F. Y.; Zeng, Y. Q., "Asymmetric activated carbon-manganese dioxide capacitors in mild aqueous electrolytes containing alkaline-earth cations", J. Electrochem. Soc. 156, A435-441 (2009)), a CNT/MnO₂ composite electrode (25.2 Wh/kg, 45.4 kW/kg; Yan, J. et al., J. Power Sources 194, 1202-1207 (2009)), and a CNT in an aqueous electrolytic (8.5 Wh/kg, 74 kW/kg; Hu, L. B.; Choi, J. W.; Yang, Y.; Jeong, S.; Mantia, F. L.; Cui, L. F.; Cui, Y., "Highly conductive paper for energy-storage devices", Proc. Natl. Acad. Sci. USA 106, 21490-21494 (2009); An, K. H.; Kim, W. S.; Park, Y. S.; Choi, Y. C.; Lee, S. M.; Chung, D. C.; Bae, D. J.; Lim, S. C.; Lee, Y. H., "Supercapacitors using single-walled carbon nanotube electrodes", Adv. Mater. 7, 497-500 (2001)).

FIG. 4b shows the cycle stability of the NPG/MnO₂ SC as a function of number of cycles. Specific capacitance was measured over 1,000 cycles at a constant charge/discharge current density of 1 A/g. There was a slight drop in capacitance over the first 500 cycles, after which capacitance stabilized at a level of about 85%. This shows that the hybrid material substance exhibits highly superior stability for energy storage applications. The highly superior capacitor ability of the NPG/MnO₂ SC is thought to arise from a combination of Faradaic and non-Faradaic processes. MnO₂ normally has low electroconductivity, which limits its charge/discharge speed, but the charge transfer reaction-type pseudocapacitance of the NPG/MnO₂ electrode can be enhanced due to the swift ion diffusion of the three-dimensional nanoporous architecture and the high electrical conductivity of the NPG skeleton. Moreover, the NPG core of the porosity hybrid composite is believed to function as a double-layer capacitor, yielding compound mechanisms for energy storage, and acting as a capacitor having extremely improved reversibility.

EXAMPLE 2

Structure of NPG/SnO₂ Nanocomposite

An $Ag_{63}Au_{35}$ (subscript numbers indicate atomic %) was selectively etched at room temperature for nine hours in a 70% nitric acid (HNO₃) aqueous solution to produce a roughly 100 nm-thick three-dimensional nanoporous gold (3D NPG) film. The dealloyed NPG sample was rinsed in purified water (18.2 MΩ·cm) to thoroughly remove any chemical substances remaining in the nanoporous channels. Electron microscope SEM observation showed that the gold thin film had a quasi-periodic porous structure of bicontinuous channels (tunnel passages) having gold ligaments (inter-pore walls or ligaments) having a characteristic length of roughly 50 nm. Using electroless plating, tin nanoparticles were adhered (plating treatment) upon the 3D NPG at room temperature for 12 hours using an 0.5M SnCl₂ aqueous solution (pH=2). Hydrazine (NH₂NH₂) gas was used as the reductant. The obtained film was rinsed with purified water to remove any remaining chemical substances.

The microstructural and chemical composition properties of the obtained NPG/SnO₂ composite were investigated in a manner similar to that used for example 1. Specifically, the shape of the surface was investigated using a field emission scanning electron microscope (SEM; JEOL 6300F, 15 keV). High-resolution transmission electron microscopy (HTEM) was performed using a transmission electron microscope (TEM; JEOL 2010F, 200 keV). The interpretable resolution defined by the contrast transfer function (CTF) of the objective lens was 0.19 nm. X-ray energy dispersive spectroscopy (EDX) was performed using a JEOL 2010F Oxford system.

Analysis of Electrochemical Properties of NPG/SnO$_2$ Composite

A lithium-ion battery was constructed as follows.

A composite (3D nanoporous Au-supported SnO$_2$ composite: 3D NPG/SnO$_2$ nanocomposite) in which tin (immediately oxidized after formation to form SnO$_2$) is deposited upon a gold skeleton using three-dimensional nanoporous gold (3D NPG) as a carrier was used as an electrode for an electrochemical Sn/Li battery, and 1M LiPF$_6$ in a liquid comprising ethylene carbonate (EC) and diethyl carbonate (DEC) (EC:DEC=1:1, v/v) was used as an electrolyte.

The battery was assembled within an argon-filled glove box (MBRAUN LABMASTER 130) with humidity and oxygen concentration levels kept at 1 ppm or less. A cycle treatment was performed upon the battery in a voltage range of 1.0 V to 0.005 V using an Arbin MSTAT battery tester system.

Results and Analysis

Nanoporous Structure of Nanoporous Gold/Ceramic Composite

Figure 11:
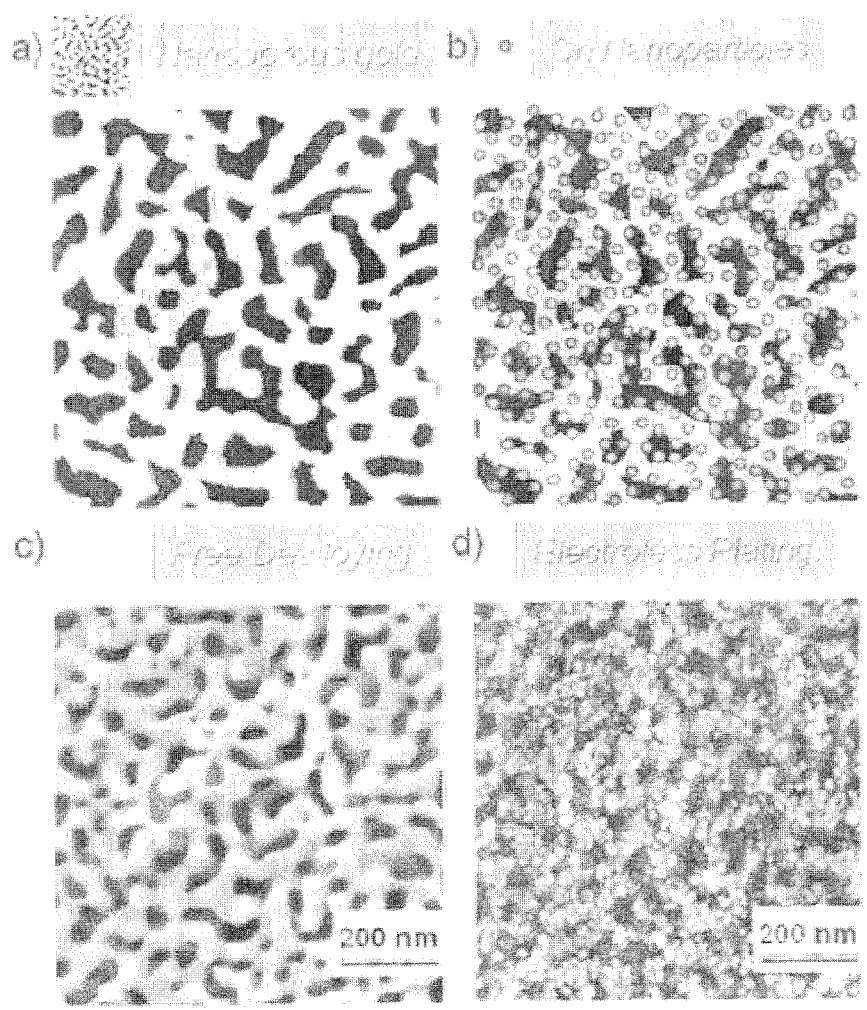
FIG. 11 is a schematic illustration of a process of manufacturing a nanoporous Au/ceramic composite material substance, specifically, an $NPG/SnO_2$ composite, combining chemical dealloying and an electroless plating treatment. The plated tin was immediately converted to $SnO_2$ in an electrolytic solution or in air.

FIG. 11a shows the schematic structure of a three-dimensionally nanoporous gold substrate (3D nanoporous Au: 3D NPG) prepared by chemically dealloying an Ag$_{65}$Au$_{35}$ (at. %) foil. Dealloying was performed by treating the foil in a 70% HNO$_3$ aqueous solution at room temperature for nine hours. FIG. 11c shows a typical scanning electron microscopy (SEM) image of dealloyed bare 3D NPG. SEM observation showed that the gold thin film had a quasi-periodic porous structure of bicontinuous channels (tunnel passages) having gold ligaments (interpore walls or ligaments) having a characteristic length of 50 nm. Reference document: Y. Ding, M. Chen, MRS Bulletin, 2009, 34, 569.

A 3D NPG/Sn composite film constituting a nanoporous gold-tin composite was produced by precipitating (plating) nanocrystalline tin in the nanoporous channels (reticulated passages or nanoporous conduits) of nanoporous gold (3D NPG) obtained by dealloying an Ag—Au alloy using nitric acid.

The tin of the composite underwent oxidation and changed into ceramic nanocrystalline SnO$_2$. The ceramic nanocrystalline SnO$_2$ was thereby precipitated (plated), producing a 100 nm-thick 3D NPG/SnO$_2$ composite film constituting a nanoporous gold/ceramic composite. The plating of the crystalline tin was performed using a modified electroless method for 12 hours at room temperature in a 0.5 M SnCl$_2$ aqueous solution (pH=2), using hydrazine (N$_2$H$_4$) as a reductant. FIG. 11d shows typical scanning electron microscopy (SEM) images showing the microstructure of the 3D nanoporous gold composite obtained via dealloying and the subsequent electroless plating treatment.

Figure 15:
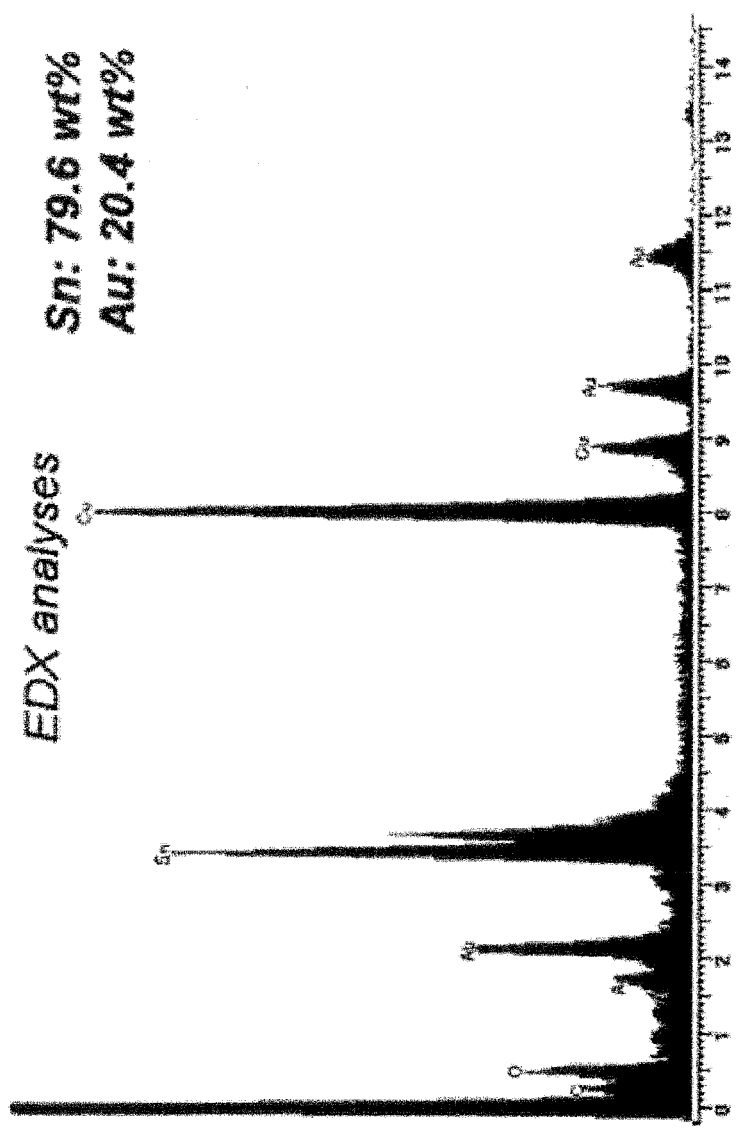
FIG. 15 is a graph showing EDX analysis results for a manufactured 3D NPG/Sn composite. The composite comprised about 79.6 weight % electrochemically active tin. Three-dimensional nanoporous gold (3D NPG) substrate (carrier) content was 20.4 wt %. The other signals for Cu, C, and O are believed to be from a carbon-lacey film supported by the copper mesh used to perform TEM measurement.

FIG. 15 shows the results of EDX analysis of the 3D NPG/SnO$_2$ composite. As is apparent from FIG. 15, the Au/SnO$_2$ composite contains roughly 20 wt % gold and roughly 80 wt % tin.

Figure 12:
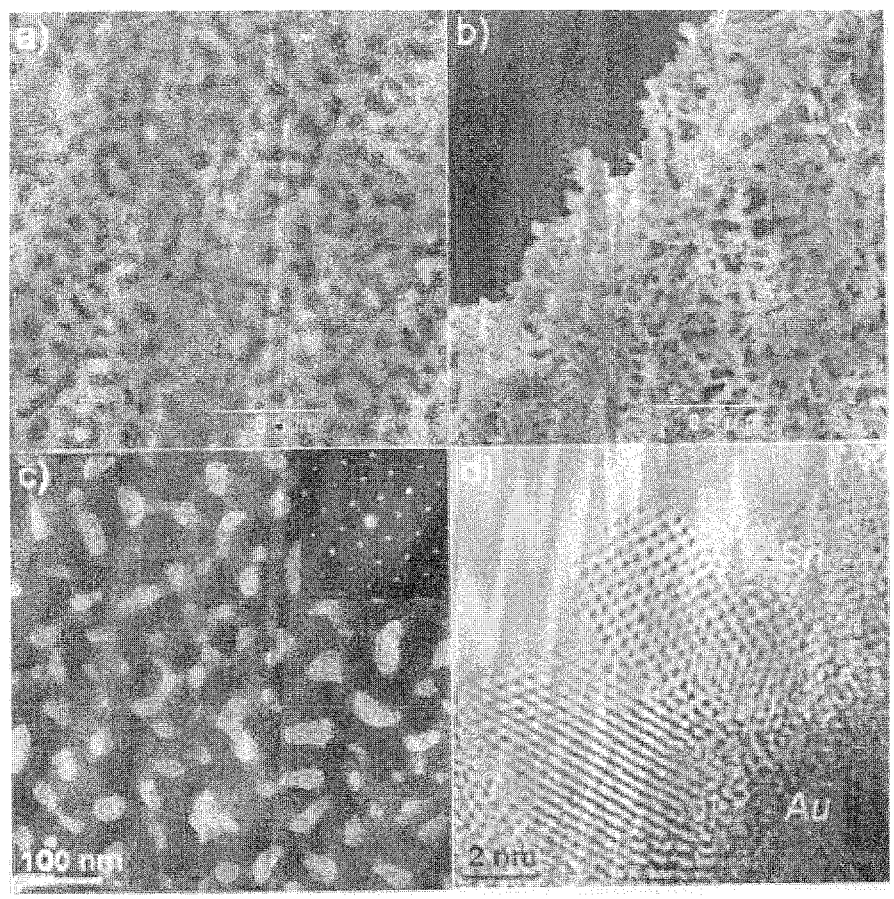
FIG. 12 shows SEM images and TEM images for a bare 3D NPG/Sn composite (specifically, a 3D $NPG/SnO_2$ composite).

FIG. 12 shows the typical microstructure of the as-manufactured 3D nanoporous gold-nanocrystalline tin composite. FIG. 12a shows an SEM image of tin (or SnO$_2$) supported by as-manufactured gold, illustrating the bicontinuous nanoporous structure. FIG. 12b shows a magnified cross-sectional image showing a network (reticulated structure) in which relatively uniform and large holes having diameters of roughly 100±50 nm are evenly distributed. The image also shows the thickness of the walls of the holes as being in a range from 20 nm to 50 nm. FIG. 12c shows a transmission electron microscopy (TEM) image thereof, and FIG. 12d shows a high-resolution transmission electron microscopy (HTEM) image. The images confirm that the deposited tin particles (or SnO$_2$ particles) have a single-crystalline shape. This is also shown in the selected-area electron diffraction (SARD) pattern shown in inset in FIG. 12c. The pattern was obtained in a broad range along orientation <110>. The ring-shaped SAED pattern confirms that the overall structure of the SnO$_2$ is polycrystalline. As can be measured from the HTEM image (FIG. 12d), the individual grains had sizes of from 3 to 6 nm.

Electrochemical Properties of 3D Nanoporous Gold/Ceramic Composite

When an electrochemical charging/discharging (dealloying/alloying) test was performed using the plated 3D nanoporous gold composite (3D NPG/SnO$_2$ nanocomposite) as an electrode, a high reversible capacity of 515 mAh/g was demonstrated in a voltage range from 0.1 to 1.0 V at a rate of 1 C (1000 mA/g). The measured charge capacity retention rate after 100 cycles was 90% of the initial value. The distinctive bidirectional carrier structure of the three-dimensional nanoporous gold (3D NPG) plays a key role in its electrochemical performance. Specifically, (i) it is possible to increase the electrode/electrolyte contact area, (ii) swift transfer of Li$^+$ and e$^-$ is made possible, and (iii) the three-dimensional structure provides suitable empty spaces, allowing large volume changes between charging and discharging to be adjusted, in turn allowing electrical insulation after extended cycle treatments to be prevented.

Figure 13:
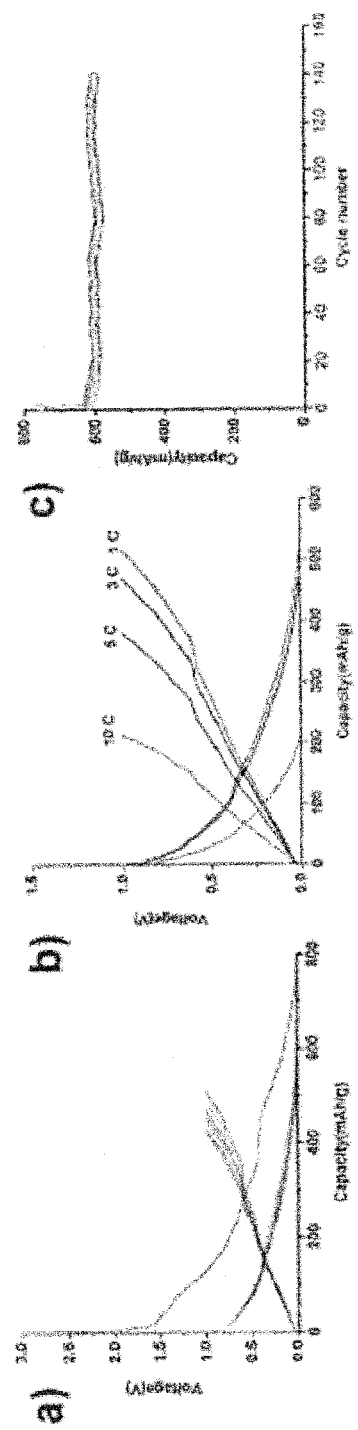
FIG. 13 shows the results from tests of the electrochemical properties of lithium-ion batteries using 3D $NPG/SnO_2$ composite electrodes. Charge/discharge cycles were performed for $Li^+/Li$ from 0.005 V to 1.0 V.

FIG. 13a shows the voltage behavior of a battery using the 3D nanoporous gold composite (a 3D NPG-supported tin (or SnO$_2$) lithium battery). Specifically, the figure shows voltage behavior at a rate of C/10 (discharging theoretical capacity for 10 hours). The figures indicate that the electrode has the characteristics of a typical tin electrode (or a SnO$_2$ electrode). In the initial discharge and charge step, respective specific capacities of 756 mAh/g and 624 mAh/g were produced, equivalent to 82% coulombic efficiency. During the initial discharge step, a thick solid-electrolyte interphase (SEI) was formed on the surface of the electrode, which is thought to result in the large losses in initial capacity of the tin electrode (H. Qiao, Z. Zheng, L. Zhang, L. Xiao, J. Mater. Sci. 2008, 43,2778: Y. W. Xiao, J. Y. Lee, A. S. Yu, Z. L. Liu, J. Electrochem. Soc. 1999, 146, 3623). FIG. 13b shows the discharge capacity of the 3D NPG-supported SnO$_2$ as a function of discharge rate (1 C to 10 C). Discharge capacity was 515 mAh/g at 1 C, 470 mAh/g at 3 C, 380 mAh/g at 5 C, and 210 mAh/g at 10 C. FIG. 13c shows the capacity-maintaining ability of the 3D NPG-supported SnO$_2$ at a rate of 0.5 C. A reversible capacity of about 599 mAh/g was clearly maintained even after 140 cycles, equivalent to 95.9% of the initial charge capacity. The better efficiency of the 3D NPG-supported SnO$_2$ compared to Sn nanoparticles (about 79% coulombic efficiency: Lee, K. T.; Jung, Y. S.; Oh, S. M. J. Am. Chem. Soc. 2003, 125, 5652-5653) may be related to the distinctive structure offering the advantages described above.

Figure 14:
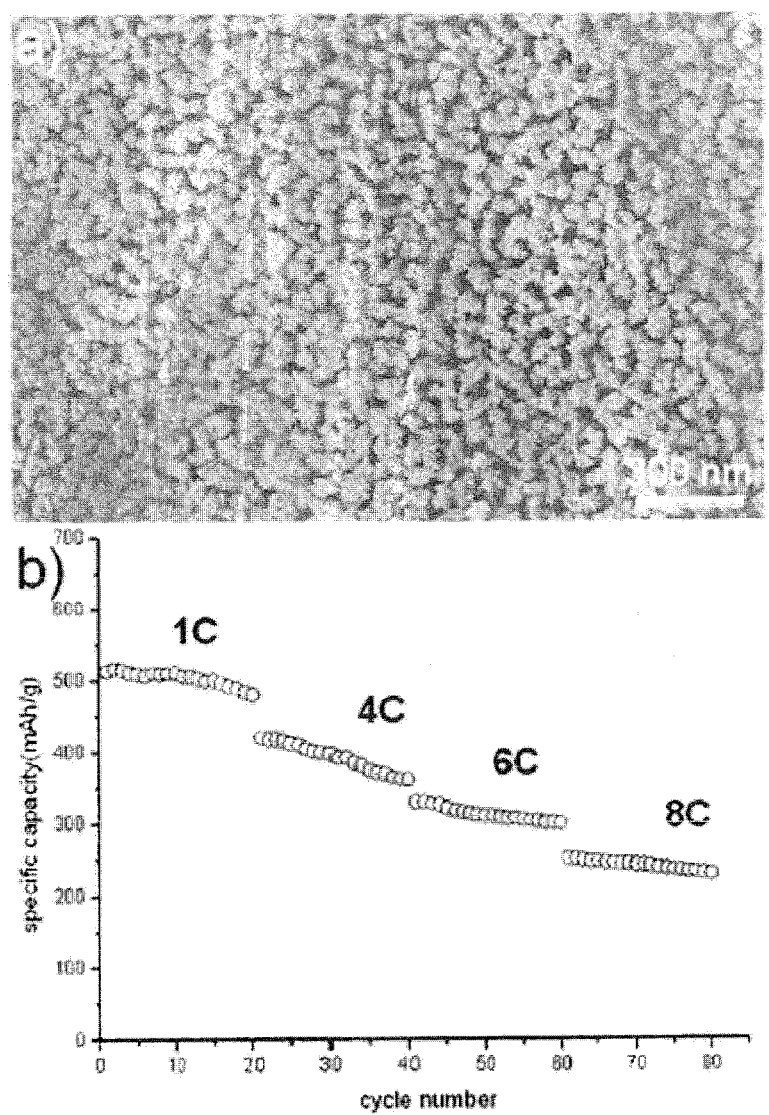
FIG. 14(a) is an ex situ SEM image for a 3D $NPG/SnO_2$ composite after being used as an electrode for a lithium-ion battery for 140 charge/discharge cycles.
FIG. 14(b) is a graph of charge capacity over cycle number for a lithium-ion battery using a 3D $NPG/SnO_2$ composite electrode used to perform charge/discharge cycles at various C rates (1 C to 8 C) from 0.005 V to 1.0 V.

FIG. 14a shows an SEM image of the electrode according to the present invention after 140 cycles at a rate of about 0.5 C and a range of 0.005 to 1.0 V. It can clearly be seen that the three-dimensionally nanoporous structure of the $SnO_2$ remains effectively intact during cycle treatment. Small changes in structure may lead to gradually reductions in capacity, as shown in FIG. 14b. In FIG. 14a, average pore diameter appears to have decreased with respect to the 3D NPG-supported $SnO_2$ composite as plated and deposited due to remaining organic electrolyte or related substances. In addition, the 3D nanoporous gold/ceramic composite according to the present invention exhibits highly superior rate performance due to the small-sized $SnO_2$ particles. As shown in FIG. 14b, capacity was 515 mAh/g when a cycle treatment was initially performed at 1 C, 420 mAh/g in a cycle treatment at 4 C, 330 mAh/g in a cycle treatment of 6C, and 260 mAh/g in a cycle treatment at 8 C.

INDUSTRIAL APPLICABILITY

Using the present invention, a nanoporous ceramic composite metal (specifically, a nanoporous metal core/ceramic deposit composite) having superior electrical properties can be obtained, allowing these superior properties to be utilized in a variety of applications in combination with electrical/electronic devices such as dielectrics, SC electrodes, lithium-ion batteries (LIBs), LIB electrodes, energy storage devices, backup power sources for portable phones and personal computers, backup power sources for electronic control devices for automobiles, and power storage devices.

It is clear that the present invention can be implemented other than as set forth in the foregoing description and examples. Various modifications and alterations of the present invention are possible in the light of the foregoing teachings, and these are thus also encompassed within the scope of the appended claims.

The invention claimed is:

1. A nanoporous metal core/ceramic deposit layer composite, wherein the nanoporous metal core/ceramic composite is characterized in that the composite has an electrolytic or electroless deposited ceramic layer formed of $MnO_2$ or $SnO_2$, on the metal core; wherein the metal core is formed of a nanoporous metal having interior pores; the ceramic deposit layer is deposited or adhered on a surface of the nanoporous metal core including interpore walls of the nanoporous metal core; and the composite has a specific capacitance of from greater than 427 F/g to 601 F/g or less.

2. The composite according to claim 1, wherein the core is a nanoporous metal, and the ceramic deposit layer is deposited on surfaces of a the interpore walls of the nanoporous metal core.

3. The composite according to claim 1, wherein the core is nanoporous gold or nanoporous copper.

4. The composite according to claim 3, wherein the nanoporous gold is obtained by dealloying a gold/silver alloy.

5. An electrode for a supercapacitor device or in a lithium ion battery, wherein the electrode is formed of a nanoporous metal core/ceramic deposit layer composite, wherein the nanoporous metal core/ceramic composite is characterized in that the composite has a ceramic deposit formed of $MnO_2$ or $SnO_2$, and a metal core, and the core is of a nanoporous metal, having interior pores and the ceramic is deposited or adhered on a surface of the core including interpore walls of the nanoporous metal core.

6. The electrode according to claim 5, wherein the core is of nanoporous gold or nanoporous copper.

7. The electrode according to claim 5, wherein the nanoporous gold is obtained by dealloying a gold/silver alloy.

* * * * *